United States Patent
Landers et al.

(10) Patent No.: US 10,455,810 B1
(45) Date of Patent: Oct. 29, 2019

(54) WIRELESS LOCATION ASSISTED ZONE GUIDANCE SYSTEM REGION LOOKUP

(71) Applicant: GPSip, Inc., Oshkosh, WI (US)

(72) Inventors: Rodney P. Landers, Woodbury, MN (US); Kevin L. Nieuwsma, Lakeville, MN (US); Chad R. James, Redmond, OR (US); Michael D. Erickson, Minneapolis, MN (US); Gregory M. Anderson, Bloomington, MN (US); Patrick J. Krekelberg, Maplewood, MN (US)

(73) Assignee: GPSIP, Inc., Oshkosh, WI (US)

( * ) Notice: Subject to any disclaimer, the term of this patent is extended or adjusted under 35 U.S.C. 154(b) by 0 days.

(21) Appl. No.: 16/237,406

(22) Filed: Dec. 31, 2018

Related U.S. Application Data

(60) Division of application No. 14/660,910, filed on Mar. 17, 2015, now Pat. No. 10,165,755, which is a (Continued)

(51) Int. Cl.
*A01K 15/04* (2006.01)
*A01K 15/02* (2006.01)

(52) U.S. Cl.
CPC .................................. *A01K 15/023* (2013.01)

(58) Field of Classification Search
CPC .... A01K 15/02; A01K 15/021; A01K 15/023; A01K 15/029; A01K 15/04
(Continued)

(56) References Cited

U.S. PATENT DOCUMENTS

| 4,393,448 A | 7/1983 | Dunn et al. |
| 4,590,569 A | 5/1986 | Rogoff et al. |

(Continued)

FOREIGN PATENT DOCUMENTS

| WO | WO 94/27268 A1 | 11/1994 |
| WO | WO 2015/021116 A1 | 9/2015 |

OTHER PUBLICATIONS

"Boundary Plus Computer Collar Unit Owners Manual", Invisible Fence, 10 pages.

(Continued)

*Primary Examiner* — David J Parsley
*Assistant Examiner* — Danielle A Clerkley
(74) *Attorney, Agent, or Firm* — Albert W. Watkins

(57) ABSTRACT

An assisted zone guidance system automatically activates a stored assisted guidance region based upon collar position at initiation, relative location of one or more assisted guidance regions, and possible query results. The assisted guidance regions are stored within a look-up table that is defined by at least one reference point, and rows and columns that are offset from the reference. The table rows and columns correspond to geographic locations. The value retrieved from the indexed array is used to either create a new assisted guidance region, select an assisted guidance region that contains the current collar location, or if the collar is not within a region to select an adjacent assisted guidance region. Each assisted guidance region contains a plurality of guidance zones that each have an associated set of characteristics used to provide behavioral guidance to an animal.

12 Claims, 8 Drawing Sheets

Related U.S. Application Data continuation-in-part of application No. 14/217,390, filed on Mar. 17, 2014, now abandoned.

(60) Provisional application No. 61/954,591, filed on Mar. 17, 2014, provisional application No. 61/801,509, filed on Mar. 15, 2013.

(58) Field of Classification Search
USPC .................................................. 119/719–721
See application file for complete search history.

(56) References Cited

U.S. PATENT DOCUMENTS

| | | |
|---|---|---|
| 4,611,209 A | 9/1986 | Lemelson et al. |
| 4,817,000 A | 3/1989 | Eberhardt |
| 4,967,696 A | 11/1990 | Tobias |
| 4,999,782 A | 3/1991 | BeVan |
| 5,046,453 A | 9/1991 | Vinci |
| 5,067,441 A | 11/1991 | Weinstein |
| 5,191,341 A | 3/1993 | Gouard et al. |
| 5,351,653 A | 10/1994 | Marischen et al. |
| 5,353,744 A | 10/1994 | Custer |
| 5,355,511 A | 10/1994 | Hatano et al. |
| 5,381,129 A | 1/1995 | Boardman |
| 5,389,934 A | 2/1995 | Kass |
| 5,408,956 A | 4/1995 | Quigley |
| 5,450,329 A | 9/1995 | Tanner |
| 5,491,486 A | 2/1996 | Welles, II et al. |
| 5,568,119 A | 10/1996 | Schipper et al. |
| 5,587,904 A | 12/1996 | Ben-Yair et al. |
| 5,594,425 A | 1/1997 | Ladner et al. |
| 5,751,612 A | 5/1998 | Donovan et al. |
| 5,791,294 A | 8/1998 | Manning |
| 5,857,433 A | 1/1999 | Files |
| 5,868,100 A | 2/1999 | Marsh |
| 5,870,741 A | 2/1999 | Kawabe et al. |
| 5,911,199 A | 6/1999 | Farkas et al. |
| 5,949,350 A | 9/1999 | Girard et al. |
| 6,043,748 A | 3/2000 | Touchton et al. |
| 6,079,367 A | 6/2000 | Stapelfeld et al. |
| 6,114,957 A | 9/2000 | Westrick et al. |
| 6,172,640 B1 | 1/2001 | Durst et al. |
| 6,232,880 B1 | 5/2001 | Anderson et al. |
| 6,232,916 B1 | 5/2001 | Grillo et al. |
| 6,236,358 B1 | 5/2001 | Durst et al. |
| 6,263,836 B1 | 7/2001 | Hollis |
| 6,271,757 B1 | 8/2001 | Touchton et al. |
| 6,313,791 B1 | 11/2001 | Klanke |
| 6,415,742 B1 | 7/2002 | Lee et al. |
| 6,421,001 B1 | 7/2002 | Durst et al. |
| 6,441,778 B1 | 8/2002 | Durst et al. |
| 6,480,147 B2 | 11/2002 | Durst et al. |
| 6,487,992 B1 | 12/2002 | Hollis |
| 6,518,919 B1 | 2/2003 | Durst et al. |
| 6,561,137 B2 | 5/2003 | Oakman |
| 6,581,546 B1 | 6/2003 | Dalland et al. |
| 6,700,492 B2 | 3/2004 | Touchton et al. |
| 6,748,902 B1 | 6/2004 | Boesch et al. |
| 6,903,682 B1 | 6/2005 | Maddox |
| 6,923,146 B2 | 8/2005 | Kobitz et al. |
| 6,943,701 B2 | 9/2005 | Zeineh |
| 7,034,695 B2 | 4/2006 | Troxler |
| 7,259,718 B2 | 8/2007 | Patterson et al. |
| 7,328,671 B2 | 2/2008 | Kates |
| 7,677,204 B1 | 3/2010 | James |
| 7,764,228 B2 | 7/2010 | Durst et al. |
| 7,786,876 B2 | 8/2010 | Troxler |
| 7,856,947 B2 | 12/2010 | Giunta |
| 8,065,074 B1 | 11/2011 | Liccardo |
| 8,115,642 B2 | 2/2012 | Thompson et al. |
| 8,115,942 B2 | 2/2012 | Thompson et al. |
| 8,155,871 B2 | 4/2012 | Lohi et al. |
| 8,624,723 B2 | 1/2014 | Troxler |
| 8,757,098 B2 | 6/2014 | So et al. |
| 8,797,141 B2 | 8/2014 | Best et al. |
| 8,839,744 B1 | 9/2014 | Bianchi et al. |
| 8,851,019 B2 | 10/2014 | Jesurum |
| 8,955,462 B1 | 2/2015 | Golden |
| 8,957,812 B1 | 2/2015 | Hill et al. |
| 9,226,479 B2 | 1/2016 | Bianchi et al. |
| 9,795,118 B2 | 10/2017 | Landers et al. |
| 9,961,884 B1 | 5/2018 | Landers et al. |
| 10,064,390 B1 | 9/2018 | Landers et al. |
| 10,080,346 B2 | 9/2018 | Landers et al. |
| 10,165,755 B1 | 1/2019 | Landers et al. |
| 10,165,756 B1 | 1/2019 | Landers et al. |
| 10,172,325 B1 | 1/2019 | Landers et al. |
| 2001/0026240 A1 | 10/2001 | Neher |
| 2003/0224772 A1 | 12/2003 | Patzer et al. |
| 2004/0108939 A1 | 6/2004 | Giunta |
| 2004/0196182 A1 | 10/2004 | Unnold |
| 2005/0034683 A1 | 2/2005 | Giunta |
| 2005/0066912 A1 | 3/2005 | Korbitz et al. |
| 2006/0061469 A1 | 3/2006 | Jaeger et al. |
| 2006/0197672 A1 | 9/2006 | Talamas, Jr. et al. |
| 2007/0204804 A1 | 9/2007 | Swanson et al. |
| 2008/0036610 A1 | 2/2008 | Hokuf et al. |
| 2008/0162034 A1 | 7/2008 | Breen |
| 2008/0246656 A1 | 10/2008 | Ghazarian |
| 2008/0252527 A1 | 10/2008 | Garcia |
| 2009/0102668 A1 | 4/2009 | Thompson et al. |
| 2009/0267832 A1 | 10/2009 | Hymel |
| 2009/0289844 A1 | 11/2009 | Palsgrove et al. |
| 2009/0292426 A1 | 11/2009 | Nelson et al. |
| 2009/0325594 A1 | 12/2009 | Lan et al. |
| 2010/0139576 A1 | 6/2010 | Kim et al. |
| 2011/0163873 A1 | 7/2011 | McIntosh |
| 2011/0172916 A1 | 7/2011 | Pakzad et al. |
| 2011/0187537 A1 | 8/2011 | Touchton et al. |
| 2011/0193706 A1 | 8/2011 | Dickerson |
| 2011/0298615 A1* | 12/2011 | Rich ............... A01K 15/023 340/539.13 |
| 2012/0000431 A1 | 1/2012 | Khoshkish |
| 2013/0008391 A1 | 1/2013 | Berntsen |
| 2013/0127658 A1 | 5/2013 | McFarland et al. |
| 2013/0141237 A1 | 6/2013 | Goetzl et al. |
| 2013/0157628 A1 | 6/2013 | Kim et al. |
| 2013/0265165 A1 | 10/2013 | So |
| 2013/0307688 A1 | 11/2013 | Hoffman et al. |
| 2013/0324166 A1 | 12/2013 | Mian et al. |
| 2014/0230755 A1 | 8/2014 | Trenkle et al. |
| 2014/0251233 A1 | 9/2014 | Bianchi et al. |
| 2015/0016730 A1 | 1/2015 | Miller et al. |
| 2015/0020750 A1 | 1/2015 | Jesurum |
| 2015/0040839 A1 | 2/2015 | Goetzl et al. |
| 2015/0107531 A1 | 4/2015 | Golden |
| 2015/0216142 A1 | 8/2015 | Landers et al. |
| 2016/0021849 A1 | 1/2016 | Loosveld |
| 2018/0055011 A1 | 3/2018 | Landers et al. |

OTHER PUBLICATIONS

"Global Pet Finder GPS Pet Tracker", http://www.amazon.com/Global-Pet-Finder-GPS-Tracker/, Nov. 19, 2013, 5 pages.
"Tagg—The Pet Tracker Master Kit, White by Snaptracs, Inc.", http://www.amazon.com/TAGG-The-Pet-Tracker-Guard/, Nov 19, 2013, 5 pages.
"Boundary Plus", http://www.invisiblefence.com/find-the-right-solution/, Jan. 29, 2013, 3 pages.
"Lookup_table", http://www.Wikipedia.org/wiki/Lookup_table, Feb. 15, 2013, 10 pages.
"SkyFence: Our_Product", http://www:gpspetfence.homestead.com/resources.html, Jan. 29, 2013, 3 pages.
"SkyFence: Purchase", http://www.gpspetfence.homestead.com/Purchase.html, Jan. 29, 2013, 2 pages.
"Tagg: About Us", http://www.pettracker.com/about-tagg, Jan. 29, 2013, 1 page.
"Kalman Filter", Wikipedia: https://en.wikipedia.org/wiki/Kalman_filter, Jan. 18, 2016, 37 pages.

(56) References Cited

OTHER PUBLICATIONS

Skinner, B. F., "Superstition in the Pigeon", Journal of Experimental Psychology, vol. 38, pp. 168-172, 1948.

* cited by examiner

FIG. 5

WIRELESS LOCATION ASSISTED ZONE GUIDANCE SYSTEM REGION LOOKUP

CROSS REFERENCE TO RELATED APPLICATIONS

This application claims the benefit under 35 U.S.C. 119(e) of U.S. provisional 61/954,591, filed Mar. 17, 2014 and co-pending herewith, and is also a continuation-in-part of U.S. patent application Ser. No. 14/217,390, filed Mar. 17, 2014 and co-pending herewith, which in turn claims the benefit under 35 U.S.C. 119(e) of U.S. provisional 61/801,509, filed Mar. 15, 2013, the contents of each which are incorporated herein by reference in entirety.

BACKGROUND OF THE INVENTION

1. Field of the Invention

This invention pertains generally to electrical communications, and more particularly to condition responsive indicating systems with a radio link and including personal portable device for tracking location. The condition responsive indicating systems of the present invention monitor the specific condition of humans or animals. In one preferred manifestation, a fully self-contained collar designed in accord with the teachings of the present invention incorporates an automatic region look-up to selectively activate a stored assisted guidance system that then is used to monitor the location of a pet such as a dog, and provide well defined and positive stimulus to train the pet to stay within a predetermined region.

2. Description of the Related Art

Dogs are well known as "man's best friend" owing to the many beneficial services that they provide. However, and likely since mankind first befriended dogs, there has existed a need to control the territory that a dog has access to. There are many reasons that motivate this need, many which may be relatively unique to a particular dog or owner, and other reasons that are far more universal.

Irrespective of the reason, there have been limited ways to communicate to a dog a territory that the dog should stay within, and to elicit this behavior from a dog. One method is a fixed containment structure such as a fence or building. A structure of this nature provides a physical boundary or barrier which blocks passage of an animal such as a pet or farm animal. As may be apparent, such structures are typically expensive and time consuming to install, and necessarily static in location. In other words, they are only useful at the location where they are constructed, and so are of no value when a pet and owner travel. Furthermore, these static structures often interfere in other ways with other activities of the dog owner, such as with lawn care or interfering with the owner's movement about a property. In addition, a dog may find ways to bypass the structure, such as by digging under a fence or slipping through a not-quite completely secured gate.

A second approach to controlling accessible territory is through a combination collar and leash or similar restraint. The leash is anchored to a fixed point, or in the best of situations, to a line or cable along which the dog can travel. Unfortunately, most dogs are notoriously bad at untangling or unwrapping a leash from a fixed object. Consequently, dogs tend to tangle the leash about trees, posts and other objects, and can become completely unable to move. If the owner is not aware that the dog has become tangled, this can lead to dangerous situations in cases such as extreme weather or when the dog has been left unattended for an extended period.

Additionally, some dogs are very good at escaping the leash, such as by backing away from the leash and using the leash force to slip off the collar, or by chewing through the leash. Once again, if the owner is unaware, the dog may travel from the desired area into other unsuitable areas such as roadways and the like. This may put both dog and humans in jeopardy, such as when a vehicle swerves to avoid the dog or when a dog has a temperament not suited to the general human population.

The leash also necessarily defines the region in which the dog may travel. For exemplary purposes, with a ground stake and a leash the dog is constrained to a circle. In this example, the owner will typically define the circle to the smallest radius that the dog may desirably travel within. As can be understood, for all but circularly shaped areas, this leads to a great deal of space that the dog cannot access, but which would otherwise be suitable for the dog.

In consideration of the limitations of static structures and leashes, various artisans have proposed other systems that provide more flexibility and capability, such as buried or above ground transmitter antennas and radio collars that either detect the crossing of a buried line or detect the reception or absence of reception of a signal broadcast by the transmitter antenna. When an undesirable location is detected, the radio collar is then triggered, typically to provide a painful electrical stimulation to the dog. Desirably, the electrical stimulation is mild enough not to harm the dog, but yet still strong enough to cause the dog to want to avoid additional similar stimulation. These systems remove the physical link between a dog and a static structure, meaning the dog will not get tangled in obstacles when moving about. Further, in the case of a buried line, the line may follow any geometry of land, and so is not limited to a circular pattern limited by a particular radius.

Unfortunately, burying a line can be difficult or impossible if there are other objects, such as irrigation systems, buried utility lines, landscaping, hard surfaces, trees, or other fixed objects. Additionally, current soil conditions such as frozen soil or snow-covered ground in the winter may also limit the ability to bury the line. Furthermore, the effort required to bury the line limits these systems to a single location, meaning the system cannot readily be moved or transposed from the home to a popular park or the like.

Radio systems that rely upon the detection of a signal to generate a shock, such as the buried line, are also well known to be significantly affected by static and other forms of Electro-Magnetic Interference or Radio-Frequency Interference (EMI-RFI). Consequently, a dog may be shocked or otherwise punished without basis or appropriate reason. This problem is also very location dependent, meaning that there are places where there is so much EMI-RFI that a radio system is completely unusable. As a result of the inability to completely eliminate or substantially eradicate the effects of EMI-RFI, the use of these radio systems is far from universal.

When the shock is instead triggered by the absence of a radio signal, such as when a beacon is used to contain a pet, obstacles such as buildings may prevent reception, undesirably limiting the range of travel of the animal. Furthermore, blocking the signal from the collar, such as when a dog lays down, is being caressed by the owner, or is oriented in the wrong direction, may also lead to radio signal attenuation and undesirable triggering of the shock.

As is known in the field of psychology, this random punishment that is commonplace in both types of radio systems can literally destroy the training of a dog, and may lead to erratic or wanton misbehavior. Instead, many dog owners continue to rely upon static structures or leashes to control the territory accessible by their dog.

Another problem arises when a dog unintentionally crosses a buried line. Since it is the crossing of the line that leads to the stimulation, even when the dog realizes and tries to return, the same stimulation originally keeping the dog in a containment area is now being used to keep the dog out of that containment area. Consequently, the dog will be extremely confused, and will commonly not return, even where the dog would have otherwise. As but one exemplary purpose, when a rabbit, squirrel, or other animate creature is being chased by the dog, the dog will typically be so intent on the pursuit as to completely lose track of the location of the buried line. The dog's speed may be so great that even the stimulation is very short as the dog crosses the buried line, in the heat of the chase. Furthermore, the dog's attention and focus are thoroughly directed at the pursuit of the animate creature, and even the most powerful stimulus may go unnoticed. However, once the chase is over, the dog's adrenaline or drive has diminished. A reasonably well-behaved dog will then most likely be moving more slowly back toward "home" within the containment area. Unfortunately then, the stimulation trying to re-enter will most frequently be of much longer duration, and much more recognized by the now not-distracted dog, than when the dog left the containment area. As can be appreciated, this is backwards of the intent of a training system.

With the advent and substantial advancement of Global Positioning Systems (GPS), presently primarily used for navigation, artisans have recognized the opportunity to incorporate GPS technology into pet containment. Several systems have been proposed in the literature for several decades, but these systems have not as yet become commercially viable.

One significant limitation of prior art GPS systems is the accuracy of the system. Accuracy can be dependent upon variables such as atmospheric variations, signal reflections and signal loss due to obstacles, and variability intentionally introduced into the system. Similar variability is found in various radio and cellular locating systems.

A GPS or similar navigation system that is accurate to plus or minus ten meters is very adequate for navigational purposes, for example to guide a person to a commercial building for a meeting or for other commerce. However, for pet containment this level of accuracy is completely unacceptable. For exemplary purposes, many residential yards are forty feet wide, or approximately 10 meters. A system that is only accurate to plus or minus ten meters might try to locate the dog in either neighbor's yard on any given day or at any given moment, depending upon unpredictable and uncontrollable variables such as atmospheric conditions. As will be readily appreciated, this unpredictable locating will lead to punishment of the animal when, in fact, the animal is within the proper location. In turn, this will lead to a complete failure of training, and erratic and unpredictable behavior of the animal.

Another limitation is the amount of calculation required to determine whether the pet is within a selected area of containment. Most prior art GPS systems use nodes to define the perimeter, and then mathematically calculate where the pet is relative to the nodes. Unfortunately, this requires a substantial amount of computation, which increases greatly as the number of nodes are increased. As a result, these systems commonly rely upon a primary processing system that is remote from the dog, to which the dog's collar is coupled via radio waves or the like. This permits the primary processing system to perform calculations and then relay results or control signals back to the collar. Undesirably, this also adds complexity, drains precious battery power limiting the usable collar time, and again makes the containment system dependent upon conventional radio communications systems. In addition, the need for both the collar and a secondary base station makes the system far less portable. This means, for example, that taking the dog away from home to a park may be impractical.

A further limitation of the prior art is battery life. A collar that must be removed and recharged every few hours is unacceptable for most purposes. Unfortunately, the intensive computations required by prior art systems require either a fast and consequently higher power processor unit, or a communications link such as a radio link to a base station. While the collar unit may transmit data back to the base unit to avoid the need for complex computational ability, even the transmission of position information and reception of collar actions requires a reasonably powered radio. It will be apparent that walkie-talkies, cell phones and other hand-held radio devices all have very large batteries to provide adequate transmission and reception life, and yet these devices often only support several hours of communications. As can be appreciated, size and weight are severely restricted for a device fully self-contained on a dog's collar, and the inclusion of a large battery is undesirable.

Yet another limitation of the prior art is the unintentional blocking or loss of GPS signals. There are a number of conditions that can lead to loss of GPS signals. One is unfavorable weather, which can lead to a severely attenuated satellite signal, and much higher Signal to Noise Ratios (SNR). Another condition is an adjacent building, canyon wall, or other obstacle that blocks satellite signals. Such a signal might, for exemplary purposes, either block all signals such as commonly occurs within a building, or instead may only block signals from one direction. However, GPS systems require multiple satellites to obtain a position fix, and even if only one of the satellites is blocked, then the ability to accurately fix position may be lost. Another situation that can lead to signal loss is when the collar itself is covered. This can, for exemplary and non-limiting purposes, occur when a dog lays down. If the dog lays in an unfortunate position partially or completely covering the collar, then satellite signals will be either blocked or too severely attenuated.

In any of these situations where the GPS signal is partially or completely blocked or attenuated, the latitudinal and longitudinal positional accuracy will either be inadequate, or may be completely lost. In such instances, a prior art collar may become completely non-functional. Worse, this loss of function can occur without notice in an erratic manner, possibly causing severe harm to the training of the dog.

In addition to the aforementioned limitations, prior art electronic fences have also attempted to train the animal using punishment, such as a shock, to elicit the desired behavior. As is very well known and established, negative reinforcement is less effective than positive reinforcement or a combination of positive and negative reinforcement. Furthermore, the type of reinforcement can also affect the temperament of the animal Consequently, it is desirable to not only provide consistent behavioral reinforcement, but also to provide that reinforcement in a positive manner.

The following patents and published patent applications are believed to be exemplary of the most relevant prior art, and the teachings and contents of each are incorporated herein by reference: U.S. Pat. No. 4,393,448 by Dunn et al, entitled "Navigational plotting system"; U.S. Pat. No. 4,590,569 by Rogoff et al, entitled "Navigation system including an integrated electronic chart display"; U.S. Pat. No. 4,611,209 by Lemelson et al, entitled "Navigation warning system and method"; U.S. Pat. No. 4,817,000 by Eberhardt, entitled "Automatic guided vehicle system"; U.S. Pat. No. 4,999,782 by BeVan, entitled "Fixed curved path waypoint transition for aircraft"; U.S. Pat. No. 5,067,441 by Weinstein, entitled "Electronic assembly for restricting animals to defined areas"; U.S. Pat. No. 5,191,341 by Gouard et al, entitled "System for sea navigation or traffic control/assistance"; U.S. Pat. No. 5,351,653 by Marischen et al, entitled "Animal training method using positive and negative audio stimuli"; U.S. Pat. No. 5,353,744 by Custer, entitled "Animal control apparatus"; U.S. Pat. No. 5,355,511 by Hatano et al, entitled "Position monitoring for communicable and uncommunicable mobile stations"; U.S. Pat. No. 5,381,129 by Boardman, entitled "Wireless pet containment system"; U.S. Pat. No. 5,389,934 by Kass, entitled "Portable locating system"; U.S. Pat. No. 5,408,956 by Quigley, entitled "Method and apparatus for controlling animals with electronic fencing"; U.S. Pat. No. 5,450,329 by Tanner, entitled "Vehicle location method and system"; U.S. Pat. No. 5,568,119 by Schipper et al, entitled "Arrestee monitoring with variable site boundaries"; U.S. Pat. No. 5,587,904 by Ben-Yair et al, entitled "Air combat monitoring system and methods and apparatus useful therefor"; U.S. Pat. No. 5,594,425 by Ladner et al, entitled "Locator device"; U.S. Pat. No. 5,751,612 by Donovan et al, entitled "System and method for accurate and efficient geodetic database retrieval"; U.S. Pat. No. 5,791,294 by Manning, entitled "Position and physiological data monitoring and control system for animal herding"; U.S. Pat. No. 5,857,433 by Files, entitled "Animal training and tracking device having global positioning satellite unit"; U.S. Pat. No. 5,868,100 by Marsh, entitled "Fenceless animal control system using GPS location information"; U.S. Pat. No. 5,911,199 by Farkas et al, entitled "Pressure sensitive animal training device"; U.S. Pat. No. 5,949,350 by Girard et al, entitled "Location method and apparatus"; U.S. Pat. No. 6,043,748 by Touchton et al, entitled "Satellite relay collar and programmable electronic boundary system for the containment of animals"; U.S. Pat. No. 6,114,957 by Westrick et al, entitled "Pet locator system"; U.S. Pat. No. 6,172,640 by Durst et al, entitled "Pet locator"; U.S. Pat. No. 6,232,880 by Anderson et al, entitled "Animal control system using global positioning and instrumental animal conditioning"; U.S. Pat. No. 6,232,916 by Grillo et al, entitled "GPS restraint system and method for confining a subject within a defined area"; U.S. Pat. No. 6,236,358 by Durst et al, entitled "Mobile object locator"; U.S. Pat. No. 6,263,836 by Hollis, entitled "Dog behavior monitoring and training apparatus"; U.S. Pat. No. 6,271,757 by Touchton et al, entitled "Satellite animal containment system with programmable Boundaries"; U.S. Pat. No. 6,313,791 by Klanke, entitled "Automotive GPS control system"; U.S. Pat. No. 6,421,001 by Durst et al, entitled "Object locator"; U.S. Pat. No. 6,441,778 by Durst et al, entitled "Pet locator"; U.S. Pat. No. 6,480,147 by Durst et al, entitled "Portable position determining device"; U.S. Pat. No. 6,487,992 by Hollis, entitled "Dog behavior monitoring and training apparatus"; U.S. Pat. No. 6,518,919 by Durst et al, entitled "Mobile object locator"; U.S. Pat. No. 6,561,137 by Oakman, entitled "Portable electronic multi-sensory animal containment and tracking device"; U.S. Pat. No. 6,581,546 by Dalland et al, entitled "Animal containment system having a dynamically changing perimeter"; U.S. Pat. No. 6,700,492 by Touchton et al, entitled "Satellite animal containment system with programmable boundaries"; U.S. Pat. No. 6,748,902 by Boesch et al, entitled "System and method for training of animals"; U.S. Pat. No. 6,903,682 by Maddox, entitled "DGPS animal containment system"; U.S. Pat. No. 6,923,146 by Kobitz et al, entitled "Method and apparatus for training and for constraining a subject to a specific area"; U.S. Pat. No. 7,034,695 by Troxler, entitled "Large area position/proximity correction device with alarms using (D)GPS technology"; U.S. Pat. No. 7,259,718 by Patterson et al, entitled "Apparatus and method for keeping pets in a defined boundary having exclusion areas"; U.S. Pat. No. 7,328,671 by Kates, entitled "System and method for computer-controlled animal toy"; U.S. Pat. No. 7,677,204 by James, entitled "Dog training device"; U.S. Pat. No. 8,155,871 by Lohi et al, entitled "Method, device, device arrangement and computer program for tracking a moving object"; U.S. Pat. No. 8,115,942 by Thompson et al, entitled "Traveling invisible electronic containment perimeter—method and apparatus"; U.S. Pat. No. 8,624,723 by Troxler, entitled "Position and proximity detection systems and methods"; U.S. Pat. No. 8,757,098 by So et al, entitled "Remote animal training system using voltage-to-frequency conversion"; U.S. Pat. No. 8,797,141 by Best et al, entitled "Reverse RFID location system"; U.S. Pat. No. 8,839,744 by Bianchi et al, entitled "Mobile telephone dog training tool and method"; U.S. Pat. No. 8,851,019 by Jesurum, entitled "Pet restraint system"; 2007/0204804 by Swanson et al, entitled "GPS pet containment system and method"; 2008/0252527 by Garcia, entitled "Method and apparatus for acquiring local position and overlaying information"; 2011/0193706 by Dickerson, entitled "Sensor collar system"; 2012/0000431 by Khoshkish, entitled "Electronic pet containment system"; 2013/0127658 by McFarland et al, entitled "Method and apparatus to determine actionable position and speed in GNSS applications"; and EP 0699330 and WO 94/27268 by Taylor, entitled "GPS Explorer".

In addition to the foregoing, Webster's New Universal Unabridged Dictionary, Second Edition copyright 1983, is incorporated herein by reference in entirety for the definitions of words and terms used herein.

SUMMARY OF THE INVENTION

In a first manifestation, the invention is a wireless location assisted zone guidance system adapted to assist in the training and management of an animal. The system includes a housing and an electrical power source contained within the housing. At least one animal stimulation apparatus is electrically coupled with the housing and powered by the electrical power source. A wireless location determination apparatus is contained within the housing, powered by the electrical power source, and adapted to operatively generate electrical latitude and longitude information representative of a current position of the housing. An electrical processor is coupled to the wireless location determination apparatus and is operative to receive electrical latitude and longitude information therefrom. Memory is included that is electrically accessible by the processor. An electrically powered human interface is adapted to convert electrical signal input to human-comprehendible output and adapted to receive electrical signals representative of human input. A data table is stored in the electrically accessible memory and uniquely locates at least two assisted guidance regions. The electrical processor is adapted to operatively compare received electrical latitude and longitude information to the data table to generate a first represented current position within the data table and to generate a second represented current position that is subsequent to the first represented current position. The electrical processor is further adapted to vary an output of the at least one animal stimulation apparatus responsive to the second represented current position relative to the first one of the at least two assisted guidance regions when the first represented current position of the housing is within the first one of the at least two assisted guidance regions. The electrical processor is also adapted to generate and convey a query to the human interface when the first represented position is outside of each one of the at least two assisted guidance regions. The plurality of guidance zones may be defined using latitude and longitude information, and each one of the plurality of guidance zones may have an associated unique set of characteristics used by the processor to provide behavioral guidance stimulation to an animal through the animal stimulation apparatus.

In a second manifestation, the invention is a method of electronically selecting, with electrical circuitry including at least a processor therein, a wireless location assisted zone guidance system region representation that is electrically stored in electronically accessible memory. The wireless location assisted zone guidance system region representation defines an electrical control signal associated with a current geographic location that is output to at least one animal stimulation apparatus. According to the method, the electrical circuitry is initiated. A location of position fixing signal transmitters is electrically determined. The current location is determined based upon electrical transmissions received from the position fixing signal transmitters. The presence of at least one stored assisted guidance region is ascertained and responsive thereto a first ascertain result indicative of no stored assisted guidance regions is generated when no presence is ascertained. A second ascertain result indicative of at least one stored assisted guidance region is generated when presence is ascertained. A new region query to create a new assisted guidance region is generated responsive to the first ascertain result. The current location is compared with a plurality of locations represented by the first one of the at least one stored assisted guidance region responsive to the second ascertain result. A first compare result is generated that is indicative of the current location corresponding to a one of the plurality of locations represented by the first one of the at least one stored assisted guidance region. A current assisted guidance region is set to the first one of the at least one stored assisted guidance region responsive to the first compare result.

In a third manifestation, the invention is a wireless location assisted zone guidance system adapted to assist in the training and management of an animal. The system comprises a wireless location determination apparatus and at least one animal stimulation apparatus. A processor is coupled to the wireless location determination apparatus and operative to receive latitude and longitude information therefrom and coupled to the at least one animal stimulation apparatus and adapted to operatively control a generation of stimulation. Memory is coupled with and accessible by the processor. A human interface is adapted to operatively enable selective control over the processor. A data table is stored in the memory as a two-dimensional array having a first index adapted to operatively represent an ordinate and having a second index adapted to operatively represent an abscissa. At least two assisted guidance regions, each one having a plurality of geographically defined guidance zones, are operatively stored in the data table. A first one of the ordinate and abscissa corresponds to longitude and a second one of the ordinate and abscissa corresponds to latitude, respectively, with each value stored in the data table identifying a one of the plurality of geographically defined guidance zones. The processor is adapted to operatively receive latitude and longitude information from the wireless location determination apparatus, retrieve a value stored in a location in the data table using the longitude information as the first array index and latitude information as the second array index, and use the retrieved value to determine a most adjacent one of the at least two assisted guidance regions that the latitude and longitude information from the wireless location determination apparatus is most adjacent to, and provide behavioral guidance stimulation to the animal through the animal stimulation apparatus responsive to the plurality of geographically defined guidance zones associated with the most adjacent assisted guidance region.

OBJECTS OF THE INVENTION

Exemplary embodiments of the present invention solve inadequacies of the prior art by incorporating an automatic region look-up to selectively activate a stored assisted guidance region. In a most preferred embodiment of the invention, the region look-up is activated shortly after collar initiation, and the collar electronics will then check to see whether the collar is within an existing assisted guidance region or near to one. Each assisted guidance region has an associated set of characteristics used to provide behavioral guidance to an animal. The determination of the guidance region is made by determination of the present location using GPS or equivalent signals. Identification of the corresponding table location is made by calculating the latitudinal and longitudinal offsets from a reference point, and using these offsets as the two indices for a double-indexed array. The value retrieved from the double-indexed array identifies the guidance region. Based upon either or both of collar location history and the desirability value returned from the table, a variety of actions may be triggered within the collar, such as providing appropriate stimuli.

The present invention and the preferred and alternative embodiments have been developed with a number of objectives in mind. While not all of these objectives are found in or required of every embodiment, these objectives nevertheless provide a sense of the general intent and the many possible benefits that are available from ones of the various embodiments of the present invention.

A first object of the invention is to provide a safe and humane apparatus for modifying the behavior of a pet. From the descriptions provided herein and the teachings incorporated by reference herein above, it will be apparent that the present invention may also be applied in certain instances to humans, livestock or other animals. A second object of the invention is to provide a fully self-contained apparatus that will determine location and provide stimuli based upon that location for extended periods of operation. As a corollary, the fully self-contained apparatus is preferably operational with universally available location systems, including but not limited to satellite GPS, cellular telephone triangulation systems, and radio triangulation system such as Loran, but may alternatively be provided with a custom location system if so desired. By using universally available location systems, there is no limit on the locations where the apparatus may be used. Another object of the present invention is to enable simple and efficient set-up and operation by a person. A further object of the invention is to efficiently and expeditiously train a pet, to significantly reduce training time and increase the effectiveness of the training. As a corollary, embodiments of the present invention will preferably provide the effective animal training while preserving the spirit and positive attitude of the animal Yet another object of the present invention is to enable a person to set an acceptable area or "safe zone" using only the self-contained apparatus, and to adjust or redefine the safe zone again by simple manipulation of the self-contained apparatus. An additional object of the invention is to enable the self-contained apparatus to automatically generate a number of zones within an assisted guidance region that facilitate positive training and behavior modification, and thereby guide a pet or other living being appropriately. Yet another object of the invention is to automatically and efficiently detect previously stored assisted guidance regions for immediate use after collar initiation.

BRIEF DESCRIPTION OF THE DRAWINGS

The foregoing and other objects, advantages, and novel features of the present invention can be understood and appreciated by reference to the following detailed description of the invention, taken in conjunction with the accompanying drawings, in which:

FIG. 5 illustrates the upper left tile or quadrant taken from the map of numerical values of FIG. 4.

DESCRIPTION OF THE PREFERRED EMBODIMENT

Figure 1:
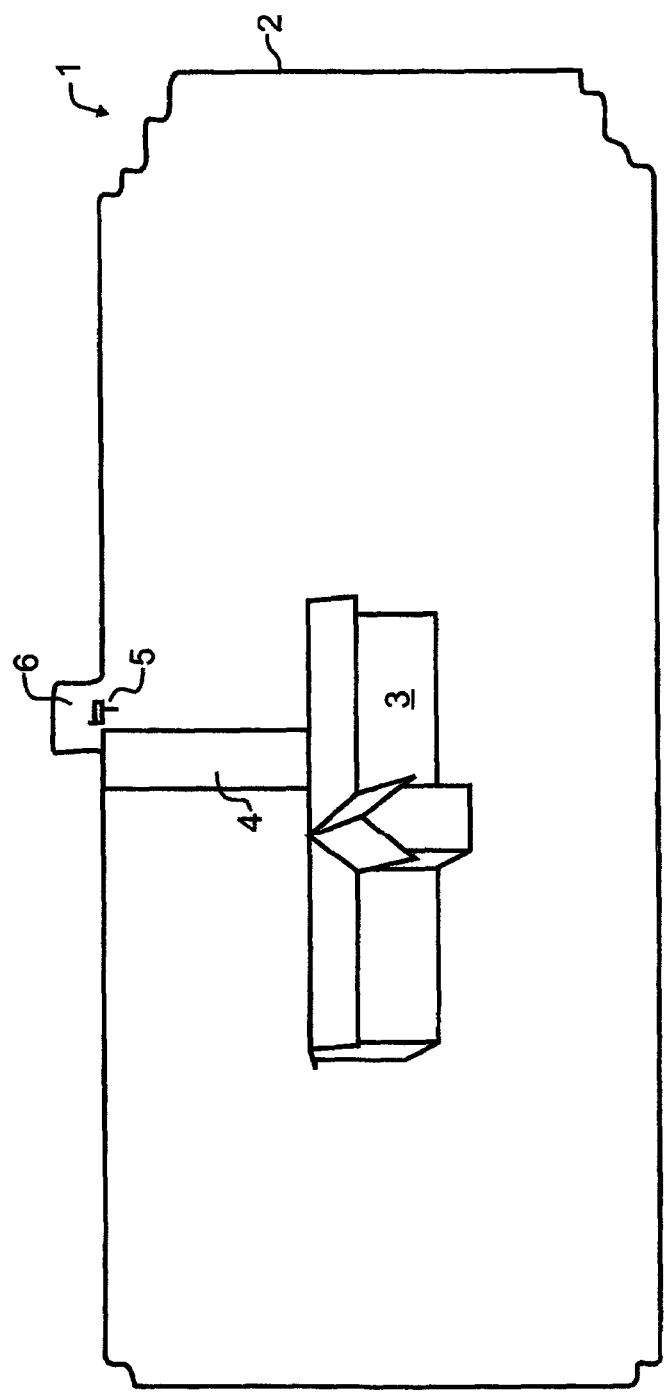
FIG. 1 illustrates a prior art property such as might be mapped in accord with the teachings of the present invention.

In a preferred embodiment designed in accord with the teachings of the present invention, a pet owner might want to train a pet to stay within an example property 1 such as that illustrated in prior art FIG. 1. An outer limit of the property 2 may encompass one or more buildings 3, a driveway 4, and a mailbox 5. If, for exemplary purposes, the pet is or will be trained to walk with the owner to the mailbox, or to retrieve the newspaper from adjacent to the mailbox, then the owner may wish to provide a small peninsula 6 which could extend beyond the bounds of the particular property location.

A self-contained collar apparatus, which might for exemplary purposes and not solely limiting thereto resemble that illustrated by Swanson et al in 2007/0204804 and incorporated by reference herein above, will preferably contain the necessary electronic components such as illustrated in the Swanson et al FIG. 5, including components to receive and decipher location determining signals and also preferably containing both volatile and non-volatile memory. In the preferred embodiment, the location determining signals are converted to latitude and longitude references, though any suitable coordinate reference representative of a geographic area may alternatively be used. Human interaction interfaces such as switches and a display will also preferably be provided, again such as illustrated in the Swanson et al published patent application, to allow a person to interact with the collar apparatus. Other requisite components, both as described in Swanson et al and as will be understood from the following description, will also be provided therein.

To establish a new area, a person will interact with the self-contained collar apparatus switches or other suitable input apparatus to identify that a new assisted guidance region is to be recorded. Next, the person will transport the self-contained collar apparatus around the perimeter of the land area, such as by following outer limit 2. During this traverse of the outer limit 2, the self-contained collar apparatus will record discrete location points which have been traversed, and add those to a table stored in a memory within the collar. Once the outer limit 2 has been traversed, the person will again interact with the self-contained collar apparatus to identify that the outer limit has been traversed, or, if so enabled, the collar will automatically detect that an area has been completely circumscribed.

Figure 2:
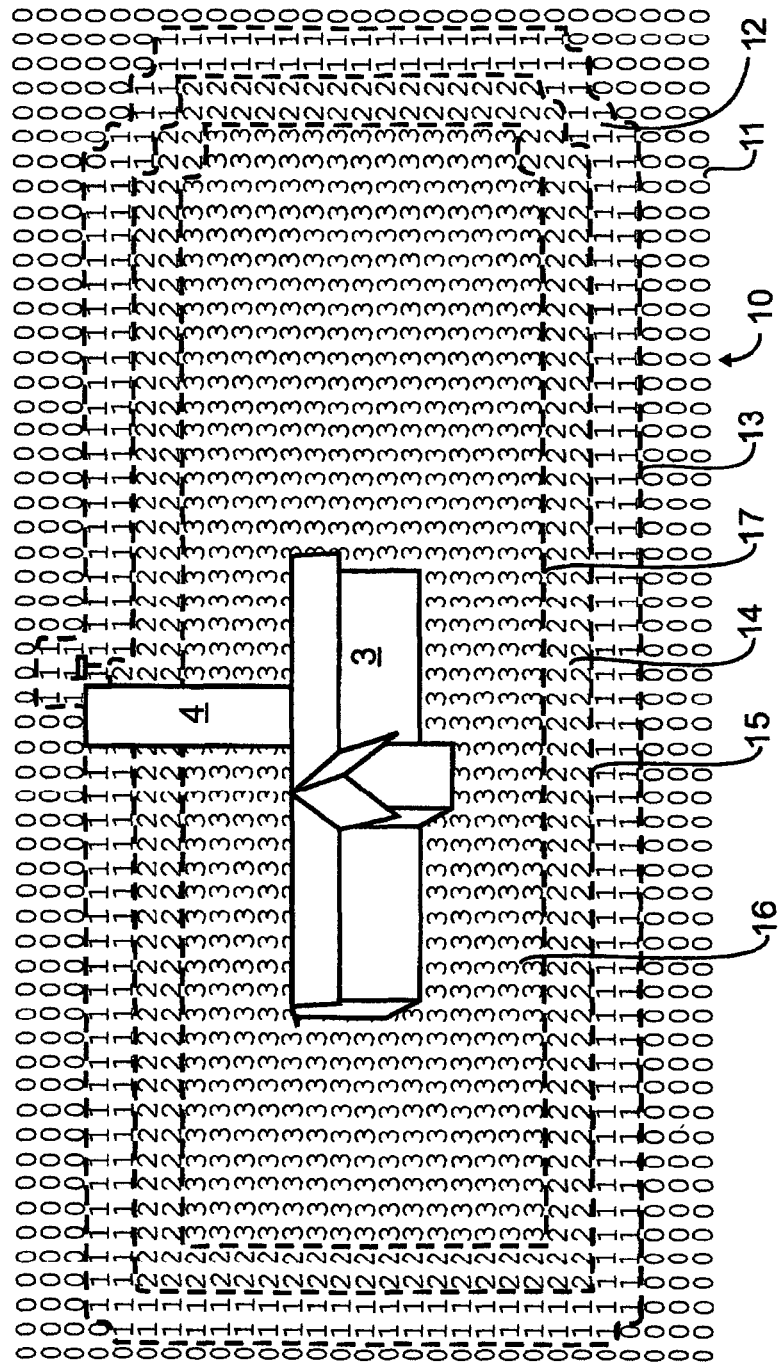
FIG. 2 illustrates a map of numerical values visually overlaid onto and electronically associated with the property of FIG. 1, in accord with the teachings of the present invention.

Next, the micro-controller or other suitable processor will preferably automatically convert this outer limit 2 into a table 10 of values such as illustrated for exemplary purposes in FIG. 2. The embodiments disclosed herein may be implemented with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices.

While the numerals 0-3 are used therein for the purposes of the present illustration, any suitable designations, whether numeric or not, may be used. As but one example, the numerals 0-3 represent four choices, and so may easily be represented by two bits of data. In such case, the possible combinations are binary 00, 01, 10, and 11. Furthermore, the present invention is not limited solely to four choices, and any number of choices, including both more and fewer than four, determined by a designer to be appropriate for the apparatus that is otherwise generally compliant with the remainder of the present description will be understood to be incorporated herein.

While FIGS. 1 and 2 illustrate an exemplary outline of an area that the pet owner might wish to contain a dog within, which is a subset of the total property, the area can be of any geometry, and in the example is somewhat irregular.

In the preferred embodiment, a number of different zones are defined based upon the traversal of outer limit 2 during initial setup. The area beyond outer limit 2 is defined by an "out-of-bounds" zone 11 represented by a numerical value of zero at each discrete location Immediately inside of the zero-value locations is a zone of locations assigned a numerical value of one. This will be referred to herein as the "second alert zone" 12. Between "out-of-bounds" zone 11 and "second alert zone" 12 in FIG. 2, a dashed line 13 has been drawn for illustrative purposes. This line does not actually exist in the stored data table, but instead helps to better illustrate the various zones that are defined by the various location values.

A plurality of discrete locations relatively inward from the second alert zone 12 are assigned a numerical value of two, and represent a "first alert zone" 14. Again, for the purpose of illustration only, a dashed line 15 is shown separating first alert zone 14 from second alert zone 12. Again, and like line 13, this line 15 does not actually exist in the stored data table, and is provided solely for illustrative purposes.

Finally, an innermost "safe zone" 16 preferably intentionally encompasses the largest area of all zones and is populated with discrete location values assigned to equal the numerical value of three. Dashed line 17, like lines 13 and 15, indicates the separate zones, but does not exist in the stored data table.

As is evident when comparing FIGS. 1 and 2, line 13 corresponds approximately to outer limit 2. Due to the discrete nature of the resolution of the particular position determining system, such as a GPS system, the points defined during the traversal of outer limit 2 may or may not exactly correspond to the land location. In addition, since the outer limit 2 may not be linear, and may instead include a number of irregularities such as peninsula 21 and slightly cropped corners 23 and 26 referenced in FIG. 3, the data points more interior but generally adjacent to these irregularities will have variability in their associated geometries relative to that of the outer limit 2. So, and again for exemplary purposes, peninsula 21 is too narrow to provide for the as-illustrated exemplary two data point width provided for each zone. Nevertheless, there is a single data point of numerical value 2 protruding at reference numeral 22 illustrated in FIG. 3. Consequently, as outer limit 2 was traversed at set-up, a dog may reach the base of mail box 5, which is located at this single data point of numerical value 2 at reference numeral 22, without receiving a second alert stimulus. Nevertheless, the dog will still receive a first alert stimulus such as a vibration. Similarly, the intricacies of notched corner 26 are lost as the corner becomes a simple square corner at reference numeral 27 of FIG. 3. Likewise, the elaborate stepping of cropped corner 23 fades some to simpler corner 24, and becomes a very simple single curve at more interior corner 25.

Also strictly for the purpose of illustration, and not limiting the invention solely thereto, two GPS location points are used as the width of each of the first alert and second alert zones. Consequently, in the embodiment as illustrated, each of these first alert and second alert zones are calculated to be approximately two GPS points in width. It will be understood herein that the width of the alert zones may be predetermined to be more or less than the exemplary and illustrated two data points. Furthermore, the number of alert zones may be varied from the two zones that are illustrated.

While the alert zone areas are, in fact, two data points wide, the width of the alert zones at sharp transition points, such as corners, may be greater or less than two data points in width. The particular decisions for how to shape interior zones will be determined by algorithms chosen or written by a designer at design time. Furthermore, there may be times where assisted guidance zones may take on a very irregular shape. This can occur, for exemplary purposes, when there is a narrow peninsula between two larger safe zones. When there is not sufficient room for the predetermined number of alert zone location points, such as within peninsula 21 of FIGS. 1 and 2, in the preferred embodiment the data point calculations still begin with the second alert zone value adjacent to the "out of bounds" area. This presents consistent operation near the borders, and provides more consistent training, which is considered herein to be very important to more quickly training an animal.

As may be apparent, a person may choose where to traverse in order to control the formation of various zones. As an example, a person trying to create a larger buffer adjacent a high traffic road would, when setting up the collar zones, simply walk an outer limit farther from the edge of the road. This maintains more consistent alert zone widths, which is believed to offer better training for an animal than varying the width of the alert zones. Nevertheless, and alternatively, it is contemplated herein to allow a person, the system, or the collar to vary the width of alert zones to correspond with various objects or hazards such as fences, gardens, and roadways.

Figure 3:
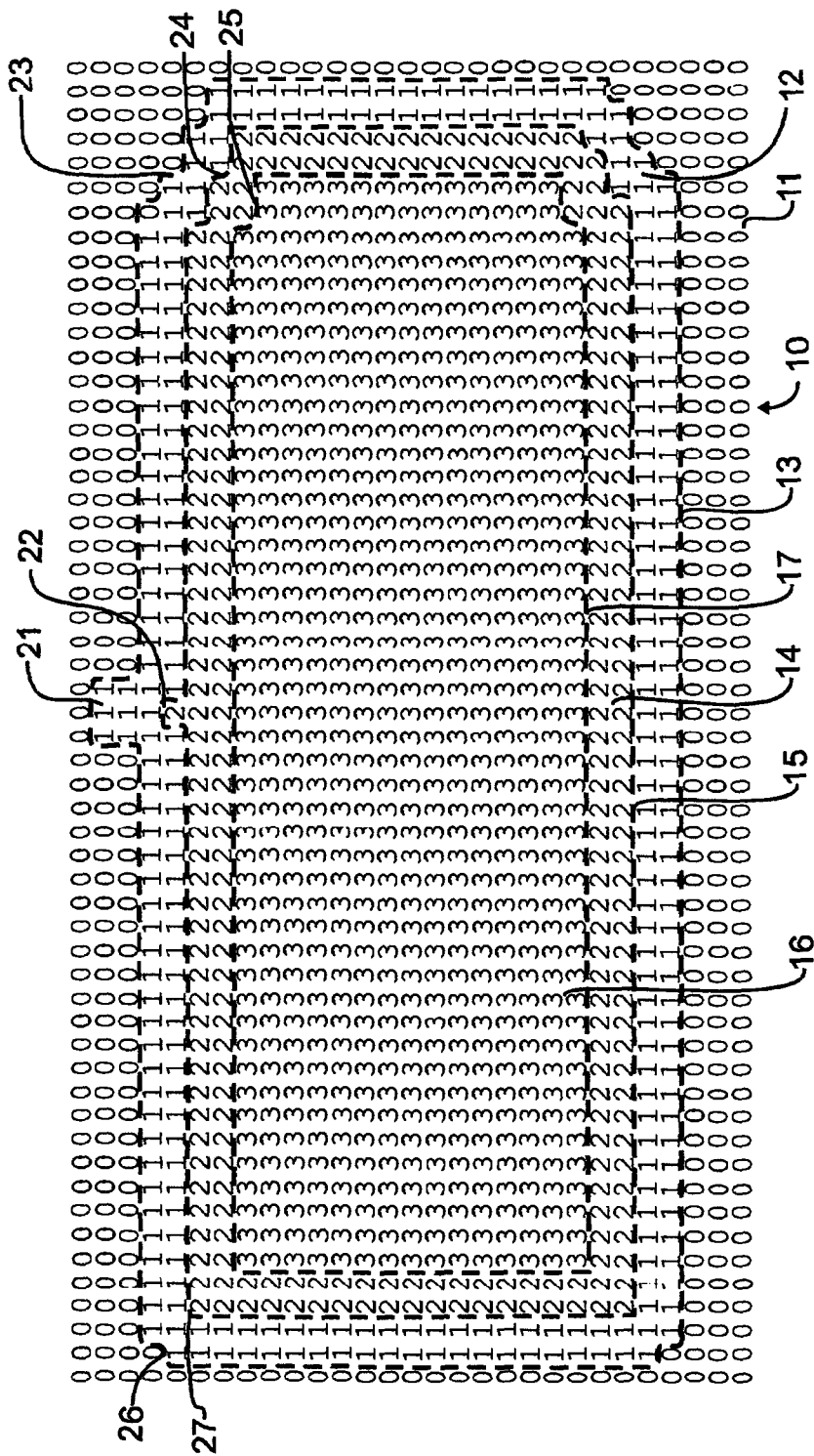
FIG. 3 illustrates the map of numerical values of FIG. 2, but absent the property illustrations.

FIG. 3 illustrates the data table 10 representation of the land area of FIG. 1, but without the land features shown. FIG. 3 simply shows the latitudinal and longitudinal plot of the shape of the assisted guidance zones, as defined by the numerical values stored in data table 10. In accord with the present invention, a latitude and longitude land map is converted to and saved as an X-Y plot or table of points, where one axis (in this case the rows) represents latitude and the other axis (in this case as illustrated, the columns) represents longitude. Each point is then assigned a numerical value that is representative of a zone within the assisted guidance region.

These points may for exemplary purposes and in accord with the preferred embodiment, correspond to specific points of geographic latitude and longitude determined to a particular degree of resolution. The degree of resolution may typically be the limit of precision available for a particular location system, such as six decimals of precision in a GPS system. So, as represented in FIG. 4, the latitude and longitude representations are presented to six decimal precision, though other suitable levels of precision are considered incorporated herein.

Noteworthy herein is the fact that the data points do not correspond to an exact measure in feet or inches. Instead, and as known in the industry of mapping, a single second of longitude at the equator is the equivalent of approximately 101 feet. In contrast, a single second of longitude at sixty degrees north latitude, which is approximately the location of Oslo, Norway; Helsinki, Finland; and Anchorage, Ak.; is only approximately 51 feet. Taken to the extreme, at the north and south poles, a second of longitude is zero feet. For prior art systems attempting to calculate distances in feet or inches, this deviation of longitudinal distance as the collar moves away from the equator drastically increases the complexity of calculations required. In contrast, the present invention directly associates GPS data points with zones, and disregards the distance in feet or inches that this may be equivalent to.

Figure 4:
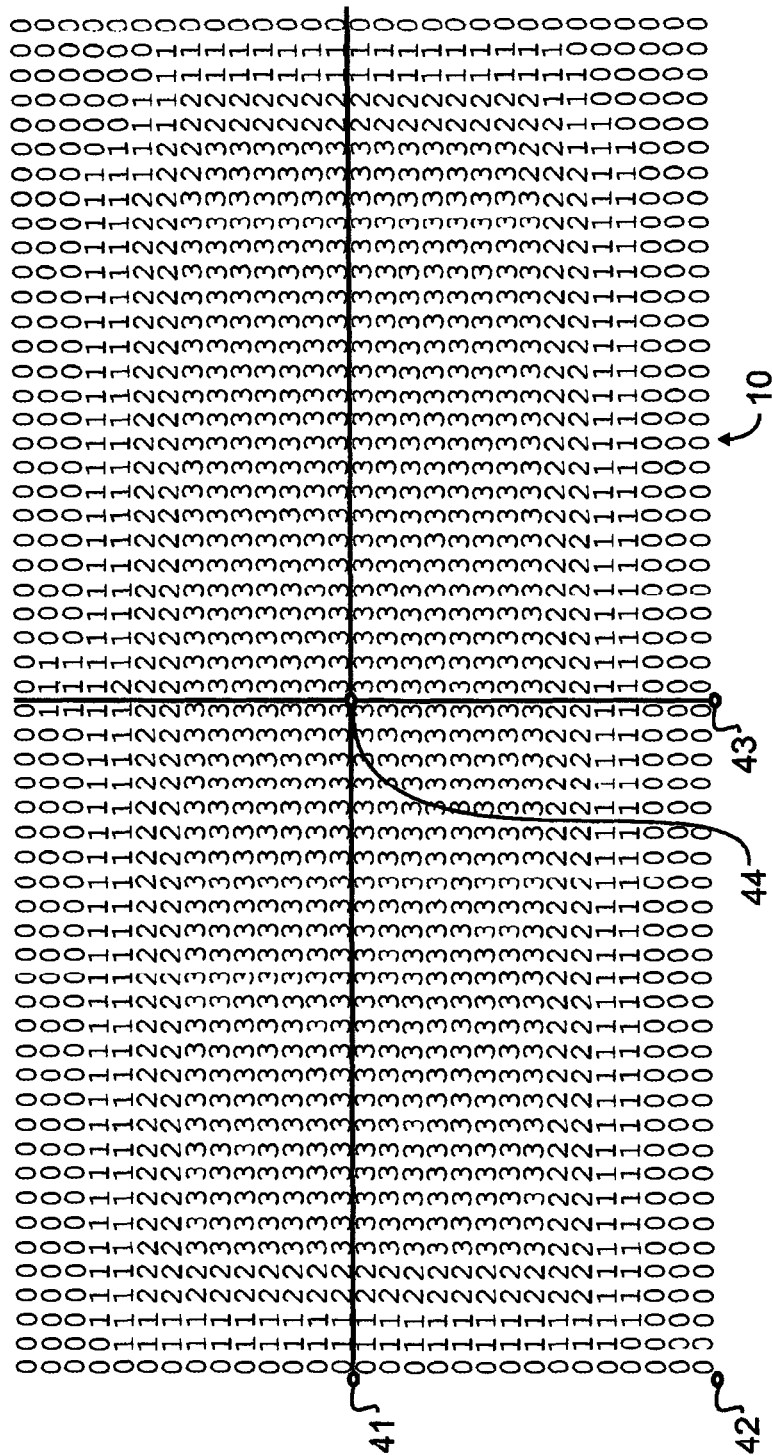
FIG. 4 illustrates the map of numerical values of FIG. 3, divided into four distinct tiles and including a latitude and longitude reference point associated with each tile.

In the illustration of FIG. 4, reference point 41 may for example represent a point at 44.925866 degrees latitude, and −92.940617 longitude. Reference point 42 may represent a point at 44.925673 degrees latitude, and −92.940617 longitude. Reference point 43 may be used to represent a point at 44.925673 degrees latitude, and −92.940160 longitude. Reference point 44 may be used to represent a point at 44.925866 degrees latitude, and −92.940160 longitude. While as illustrated these reference points 41-44 are shown slightly offset from and intermediate between the various data points, they may instead be selected to correspond exactly to a particular data point in table 10.

As may be appreciated, for a given amount of latitude and longitude resolution, the larger a tile is, the more memory is required to store the tile. In other words, if the GPS data point resolution were representative of five foot increments across the surface of the earth, it would only take twenty of these increments to cover a one hundred foot property boundary. For a square property of 100 feet by 100 feet, there would only be a total of 400 data points within the outer boundary. Even with the inclusion of data points outside of the boundary, this property could easily be mapped with a thousand data point tile.

In contrast, using this same five foot resolution, a large property such as a large ranch, farm, park, or the like would require more than one million points to map. As may be appreciated, this requires one thousand times the tile size to save the entire assisted guidance region within a single tile in memory, or one thousand times the available memory.

Storage of data table 10 requires memory, and a suitable electronic system within the collar will not be provided with unlimited memory within which to store data points. The particular type of memory selected is well within the level of skill of a designer of portable devices using microprocessors, micro-controllers and the like, and the invention is not limited to a single or particular type of memory. In accord with a preferred embodiment of the system, the memory will be divided into some combination of slower non-volatile memory and relatively faster but volatile RAM. The slower, non-volatile memory for exemplary but non-limiting purposes might comprise well-known flash memory. If the device uses higher speed memory such as RAM to reduce operation time, and there are more data points than available space in RAM to store table 10, the preferred embodiment processor will analyze the table and set up one or more tiles in RAM to be used during system operation.

To cover the exemplary property of FIG. 1, the numerical representation of FIG. 4 incorporates a total of four distinct "tiles" or squares that contain these numerical representations. FIG. 5 provides a zoomed-in view of only one of these four tiles, the top left tile of FIG. 4. Using this preferred numerical representation substantially reduces the calculations required when compared to the prior art.

In an exemplary operation, the latitude-longitude location of a dog is determined through the GPS system as is known in the field of navigation. This is then used to determine which tile, plurality of tiles, or single numerical representation is required to determine the position of the dog. If the tile containing the particular latitude and longitude is not already loaded into RAM, then it will be loaded. This determination will be easily made by comparing the current latitude and longitude to the reference points such as points 41-44 to select the appropriate tile(s). Then, preferably and for exemplary purposes, a simple RAM access may be made, where the RAM memory location is calculated based upon the present latitude and longitude offset from the lower-left latitude and longitude found on the numerical representation tile. This lower-left corner may be understood to be the reference location for the tile, such as reference point 41 in the illustration of FIG. 5. While any point within a tile may be used as a reference location, the lower-left is illustrated for exemplary purposes.

Figure 5:
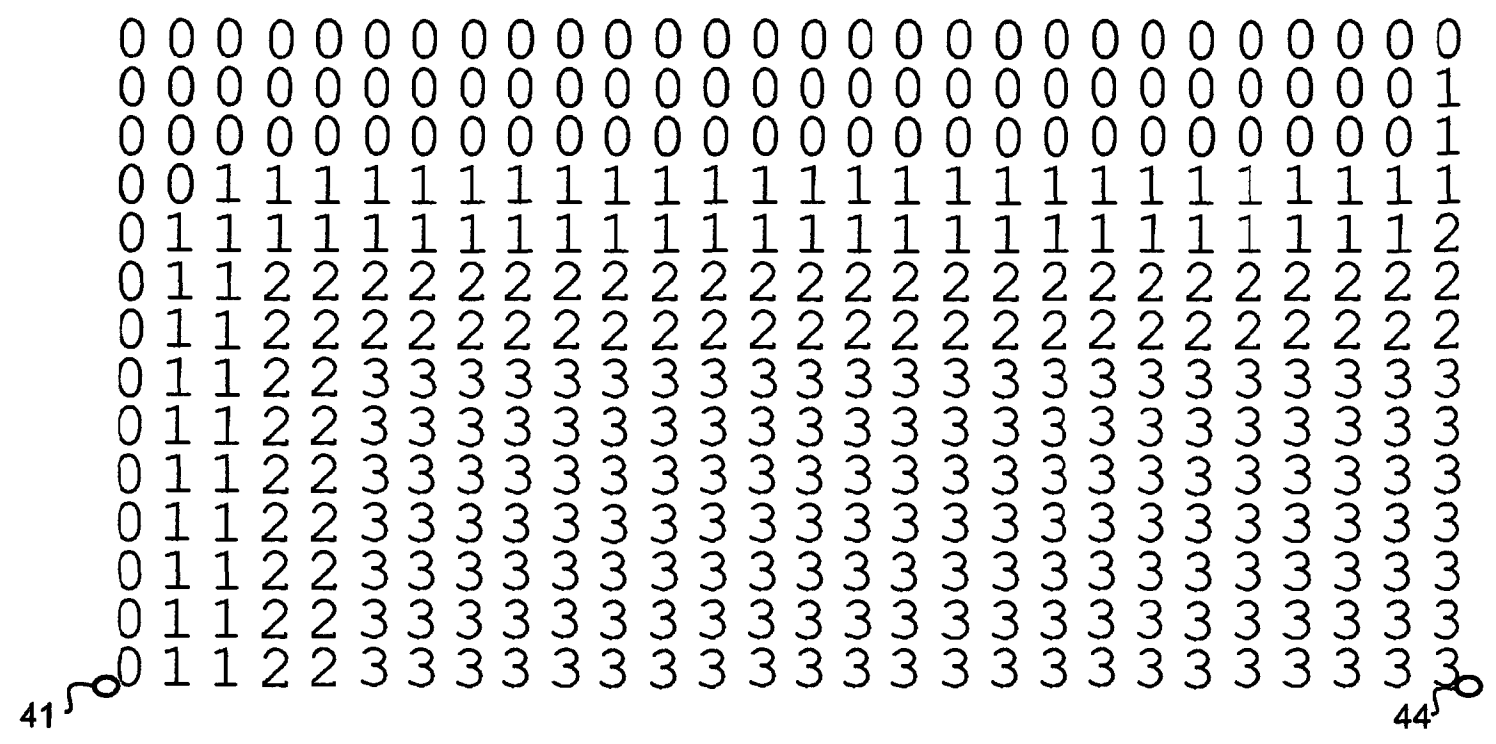

The offset determination is a simple subtraction of the reference location, such as reference point 41 of FIG. 5, from the currently determined location. Then, this difference is used as the table index, to directly address the particular table location. In the preferred embodiment, each data point is stored in memory using a double-indexed array, with each of the two indices of the array uniquely representing one of the latitudinal or longitudinal offset from the reference point. For exemplary purposes, this may be written as ArrayName [latitude-offset][longitude-offset]. Each unique [latitude-offset] [longitude-offset] may for exemplary purposes point to a unique location in memory where the zone value associated with that geographic location is stored.

In an alternative embodiment, the offset may be additionally converted in a proportional or scalar calculation, where a particular number of degrees of latitude, for example, are known to equal one data point shift to the right in table 10. This requires storing the scalar conversion and an extra scalar calculation to look up the data value for a location, both which may be undesirable for some applications.

Once the offset is calculated, then the memory location is queried and the contents of the memory are returned in the form of a numerical value from 0-3, the meaning which represents whether the dog is comfortably within the safe zone ("3" in the preferred embodiment), or is in the first alert ("2" in the preferred embodiment), second alert ("1" in the preferred embodiment), or out-of-bounds zones. After GPS location is determined, the only calculation required during operation of the dog collar to determine whether the collar is within an assisted guidance zone is the calculation of offset in latitude and longitude from the reference point in the lower left corner of the tile. This is a very rapid and easy calculation, followed by a near-instantaneous read of the memory contents. In the preferred embodiment then, all numerical representation calculations are performed at the time the outer limit is defined, and then these numerical representation tiles are saved, preferably in non-volatile memory such as within EEPROM, flash memory, or equivalent storage. Saving in non-volatile memory allows the stored map to be used at a later date, even if the battery should fail in the interim.

The procedure used to clear a map from memory is also quite simple in the preferred embodiment. Once the user selects the map to delete, the associated tiles in memory are simply rewritten to numerical values of zero; or simply deleted from a directory of memory or a file allocation table; or otherwise deleted as known in the field of computing.

When the collar is in use for pet containment, the numerical representation tiles may be swapped into and out of active memory as required. This means that storage of diverse locations does not require storage of every location in between. So, for example, storage of two distinct one acre maps on opposite sides of the earth does not require storing millions of acres of maps. Instead, only those tiles associated with a latitude and longitude actually used by a map are required to be stored in memory. Again, while the use of tiles is not essential to the operation of the present invention, the ability to create these tiles means that with only very modest amounts of memory and processing capability, the present invention may be used to map one or a plurality of assisted guidance regions literally anywhere on earth.

A number of other features may also desirably or optionally be incorporated into a preferred embodiment pet assisted guidance system. Using the teachings of the present invention, the collar may be designed to contain an entire and independent pet assisted guidance system. In other words, no additional components would need to be purchased or acquired, nor is there a need for any other external device other than the GPS satellites. The collar will preferably interact directly with GPS signals received from GPS satellites, and may for enablement use a commercially available set of components to determine latitude and longitude.

Desirably, the accuracy of the GPS determinations may be significantly improved by incorporating a loosely coupled inertial navigation system into the collar. The inertial navigation system may then be used to validate GPS readings, and may also be used to discard outlier position info such as might be produced sporadically. For exemplary purposes, when an inertial system indicates no movement of the dog and a GPS or equivalent determination indicates a sudden multi-meter jump, then the data point indicative of a sudden multi-meter jump can be discarded or ignored. Likewise, tracking movement of the collar in combination with a compass within the collar may be used to determine what direction of travel is in a forward direction. Dogs do not run backwards. Consequently, if the GPS determination indicates a sudden reversal of direction without an associated reversal of direction by the compass, then this may also be discarded or ignored.

An inertial system or biometric system may also optionally be used to pre-alert dog state and predict sudden location changes. This can be used to be more pre-emptive at alerting the dog of impending boundaries. Exemplary biometric indicators might be heart or respiration rates, and an exemplary inertial indicator might be a sudden head lifting or movement.

Inertial, biometric and location-based indicators may further be used to control the frequency of GPS position calculation, which in turn is related to the average power consumption and battery life. So, for exemplary purposes, if the collar is in a dwelling, the GPS may be deactivated. Similarly, if inertial and/or biometric indicators suggest that the dog is sleeping, the sampling rate may be substantially less frequent, if at all, until the dog wakes up. Additionally, when the dog is within the safe zone, the sampling rate may also be less frequent.

When desired, a remote control interface or external device may also be provided, but such device is not mandatory. Where such an interface is provided, assisted guidance regions may also be communicated from an external computing device such as a cellular telephone or various other mobile or fixed computing devices. In such case, the collar unit will preferably be provided with a local wireless interface. The local wireless interface may be of any suitable type, including but not limited to Bluetooth™, cellular, or other type of radio or alternative communications link.

These assisted guidance regions may at least in some cases be calculated without requiring a person to first walk the perimeter. While not solely limited thereto, this can be particularly helpful at popular places such as at dog parks or other public places that might be frequented by many pet owners. In such case, a map already created for the park may be provided and may, for exemplary purposes, be downloaded from an Internet location through a smart phone, computer or other computing device. The map may be directly forwarded to the collar, or may be edited within the computing device and then forwarded. Additionally, with such an interface a user might draw an assisted guidance area perimeter or even various zones upon an electronically stored map and transmit them to the collar.

As aforementioned, there will preferably be multiple zones in the assisted guidance region such as the "safe", "first alert", and "second alert" zones to train and shape the behavior of an animal such as a pet, so that appropriate behavior may be rewarded, thereby improving training effectiveness and success. A very preferred aspect of the present invention is the careful rewarding of good behavior, and guiding the animal to the safe zone. This is most preferably accomplished in an entirely non-aversive manner. For exemplary purposes, a comforting stimulus may be provided at particular time intervals to assure or reassure a dog within the safe zone 16. Furthermore, such stimulus may be timed in accord with activity of the dog, such as when the dog is moving about and remaining within safe zone 16. For exemplary purposes and not solely limiting thereto, a comforting tone or recorded sound such as the owner's voice saying "good dog" may be periodically generated.

In one embodiment contemplated herein, the velocity of the dog, including direction and speed, will also be calculated, by using the difference of the current and previous positions over time. In the event there is a danger of the dog moving outside of the safe zone, the first alert zone 14 stimulus may be applied, until the dog is confirmed to be remaining in safe zone 16, whereby the comforting stimulus may be applied.

The first alert zone 14 assigned with a numeric value of "2" may be used to generate a vibration which is preferably very distinct from the comforting tone or "good dog" recording of safe zone 16. This vibration will preferably gently alert the dog of the transition out of safe zone 16 and to the need to return thereto. Furthermore, this first alert zone vibration may be varied in both intensity and frequency when desired, for exemplary and non-limiting purposes such as to be further representative of such factors as proximity to adjacent zones, direction of travel, and speed of travel. The purpose of the first alert stimulation is not to invoke pain in any way, or to provide any punishment. Consequently, a gentle vibration or distinct tone is preferred. The purpose is simply to catch the attention of the dog and communicate to the dog that the dog has left the safe zone, so that the dog can elect to move back into the safe zone. This first alert is provided in real time, so that the dog will understand the purpose of the alert.

An important feature of the present invention is the detection of at least one indicator of the direction of travel of the dog, and whether that direction of travel is indicative of progress toward returning to the safe zone. For exemplary purposes only, and not solely limiting the present invention thereto, these indicators might include one or more of the following: sequential GPS position determinations indicating a shift of position toward the safe zone; a compass indication of a directional shift toward the safe zone; an inertial sensor detecting a direction change toward the safe zone; or other suitable indication of direction. In an alternative embodiment, the indicators might also include intent of direction by the animal. When the dog is outside of the safe zone and the indicator of direction of travel indicates movement toward the safe zone, the safe zone stimulus will most preferably be provided. In the preferred embodiment, this may be a short sounding of the safe zone tone, for exemplary and non-limiting purpose, to reward the animal for moving toward the safe zone. Once back in the safe zone, the dog will again receive positive reinforcement from the safe zone stimulation as described above.

The second alert zone 12 assigned with a numeric value of "1" may be used to trigger a low level electrical impulse stimulation or other stimulation different from that of the safe zone and first alert zone stimulation. Once again, this stimulation will very preferably not generate pain, but instead will provide a distinct stimulation. Tactile stimulation is used in the preferred embodiment, with the desire to incorporate communications through a sensory pathway different from the auditory stimulation of the safe zone.

Noteworthy herein is that electrical impulse stimulation is well known in the medical, veterinary, and biological sciences, and can be varied for a particular intent. A weak stimulation may be unnoticeable. As the strength of stimulation is increased, there may be a gentle tingle. An even stronger stimulation can cause mild muscle contraction, and with enough strength, there can be a painful stimulation. For exemplary purpose, Transcutaneous Electrical Nerve Stimulation (TENS) is used in the treatment of humans explicitly as a technique to alleviate pain, rather than to cause pain, and electric current is likewise used in wound healing and tissue repair. Consequently, for the purposes of the present invention, this second alert zone stimulation will be understood to be detectable by the animal, while remaining below the threshold of pain.

The purpose of this second alert zone stimulation is, just as with the first alert zone stimulation, to gain attention of the dog, communicate the impending boundary, and to give the dog the opportunity to return to the safe zone. By making the stimulation different from the first alert zone, this second alert zone stimulation will also clearly provide proper notice to the dog of the impending boundary. This notice is provided in real time, so that the dog will understand the purpose of the notice.

Most preferably, if electrical impulse stimulation is used in the second alert zone, the stimulation will be provided using technology such as illustrated in U.S. Pat. No. 7,677,204 incorporated by reference herein above, which is considered to be a most humane method of application. Nevertheless, and while much less preferable, other known techniques for electrical impulse stimulation will be considered herein as alternative embodiments. Furthermore, this second alert zone electrical impulse stimulation may be varied in both intensity and frequency when desired, for exemplary and non-limiting purposes such as to be further representative of such factors as proximity to adjacent zones, direction of travel, and speed of travel. As with the first alert zone, in the second alert zone when an indicator of direction of travel indicates movement toward the safe zone, the safe zone stimulus will be provided.

Finally, a numeric value of "0" designates a point outside of the second alert zone. In this case, the dog may be stimulated with a stronger electrical impulse stimulation. However, this stimulation will most preferably not continue indefinitely, which will be recognized to be quite aversive. In the foregoing description, time is described as one factor for calculating when to discontinue electrical impulse stimulation. Preferably, in addition to time, the direction of travel of the dog will also be considered. As soon as the dog starts moving toward the safe zone, electrical impulse stimulation will be discontinued irrespective of time outside of the safe zone. Instead, in the preferred embodiment positive feedback such as a safe zone or similar stimulus is provided when the dog is moving in a direction back toward the safe zone. If instead the collar unit detects movement away from the safe zone, the collar unit will deliver a second alert zone stimulus to the dog. In the preferred embodiment, this second alert zone stimulus is a medium electrical impulse stimulation selected to provide tactile stimulation that does not invoke pain. If the collar unit detects movement that isn't getting closer or further away, it delivers the "first alert" vibration to the dog. In this manner, the dog is continually and immediately rewarded for movement toward the safe zone, is reminded through auditory stimulation for indeterminate movement, and receives tactile stimulation for movement away. The dog will thereby be directed back into the safe zone. As the dog is crossing back into the second alert zone from the "out of bounds" zone, the collar unit will preferably combine the comforting tone of the safe zone with a medium level vibration until the dog is in the safe zone. At that time, the collar unit will revert from this wayward dog shepherding mode back to the initial containment mode. This allows appropriate pet behavior to be rewarded, thereby improving training effectiveness and success.

Nevertheless, the present invention is not solely limited to a particular number of zones within an assisted guidance region, or a particular way to represent those zones. The numerical representations from zero to three are preferred, but any other representations that may be machine stored are contemplated herein.

Figure 6:
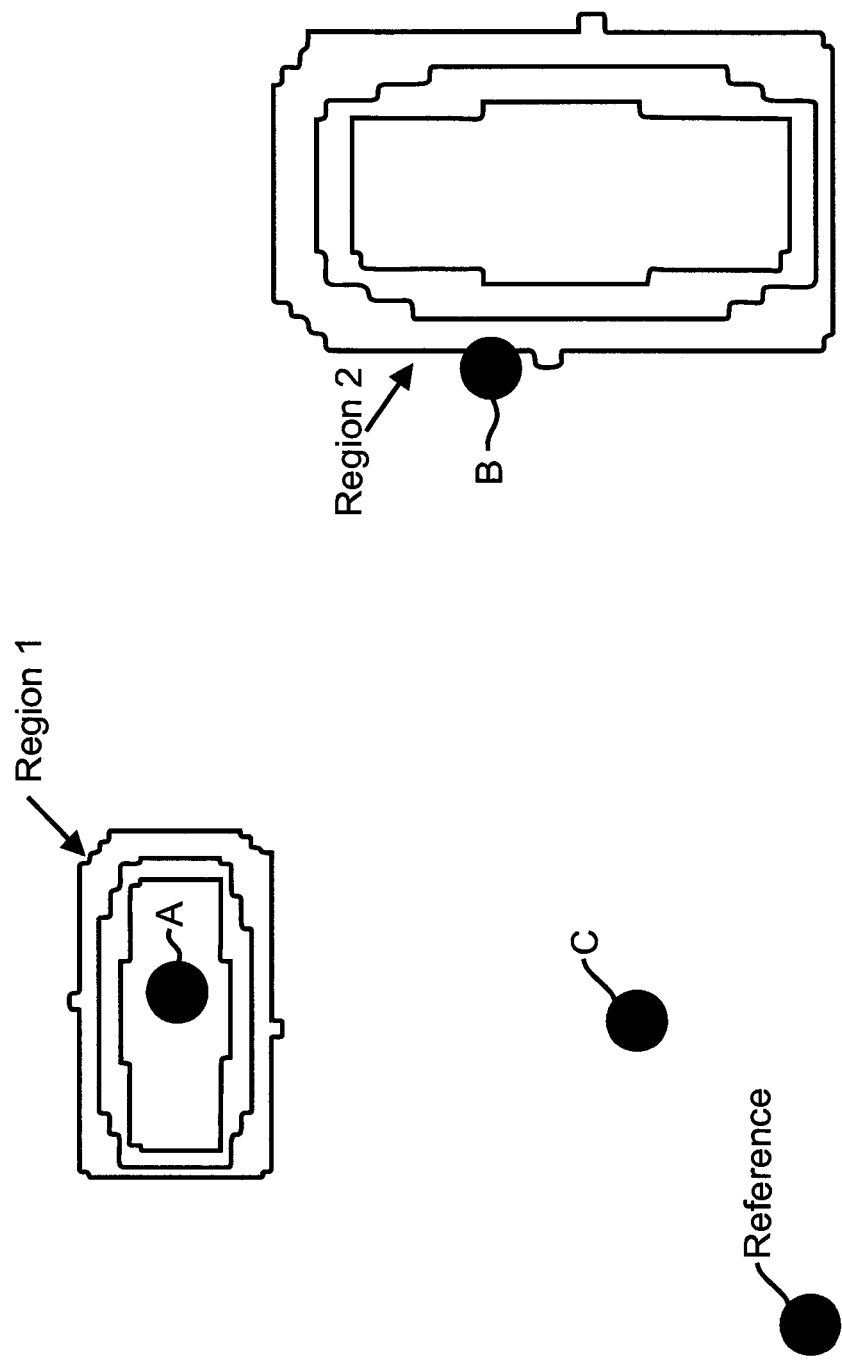
FIG. 6 illustrates an exemplary region lookup table designed in accord with the teachings of the present invention.

FIG. 6 illustrates a preferred assisted guidance region look up method. For purposes of illustration, Region 1 and Region 2 are simply illustrated as a set of lines. Nevertheless, it will be understood that Region 1 and Region 2 each comprise the four zones as described herein above with reference to FIGS. 2-5: safe, first alert; second alert; and out-of-bounds. While a different number of zones may be used, in the preferred embodiment there are four zones associated with each region as illustrated.

These two regions are a part of a single tile represented in memory as a table resembling table 10. Consequently, and while not illustrated to avoid clutter and confusion, this table will be populated with the numbers 0-3 for each GPS resolution point just as with table 10. A reference point for the tile is located on the lower left corner, equivalent to reference points 41-44 already described herein above.

Figure 7:
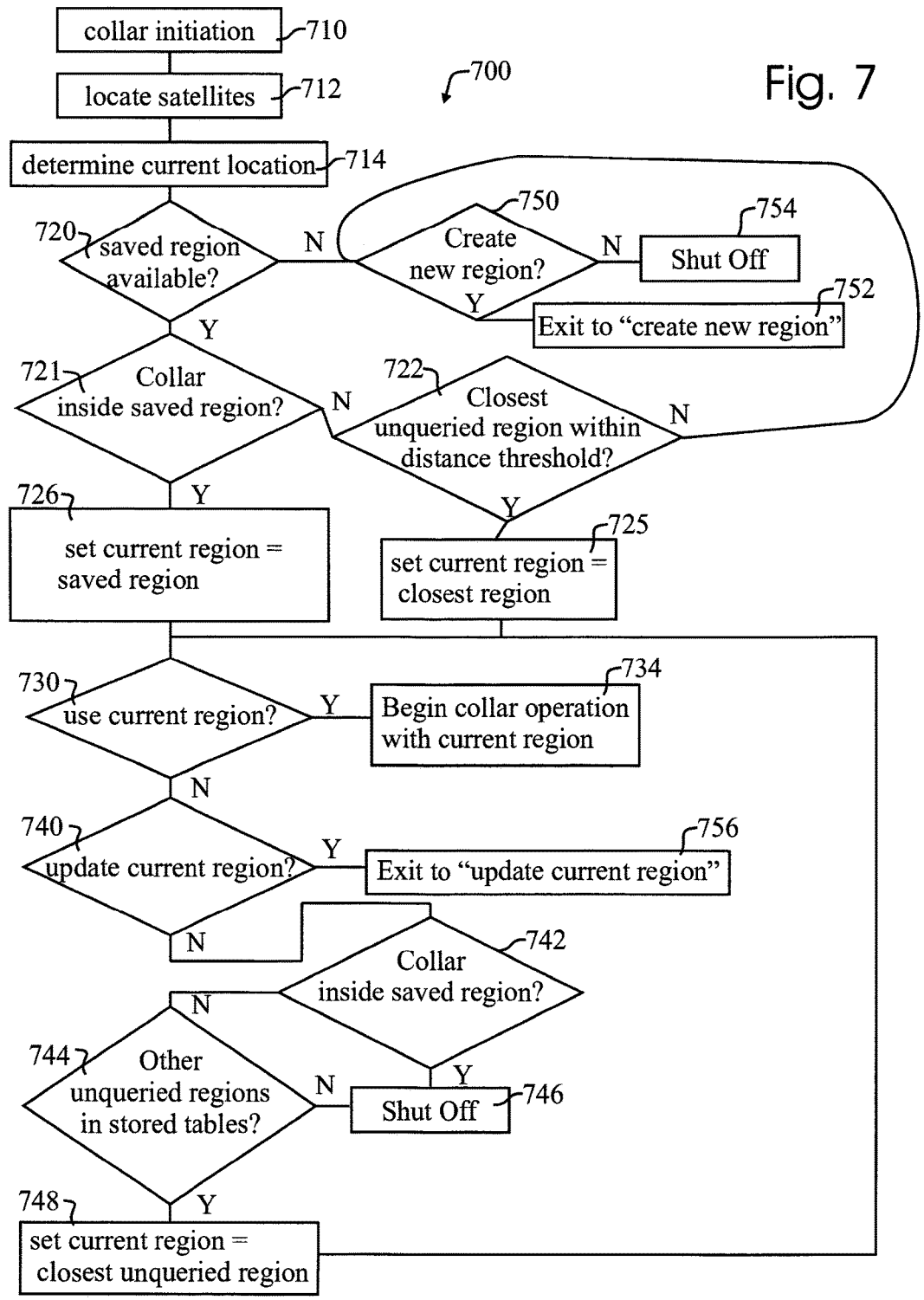
FIG. 7 illustrates a preferred embodiment assisted guidance region lookup method operative in combination with a lookup table in accord with the teachings of the present invention.

FIG. 7 illustrates a preferred embodiment assisted guidance region lookup method 700 operative in combination with a lookup table 10 similar to that of FIGS. 2-6 in accord with the teachings of the present invention. When a collar is powered on or otherwise initiated at step 710, the collar electronics will locate satellites at step 712 and then determine current location at step 714, both as known in the art of GPS position determination. Once collar location is determined, the collar electronics will check for saved assisted guidance regions, such as Region 1 and Region 2 as illustrated in FIG. 6, at step 720. If the 0-3 numeric values are used in table 10 as described herein above, this check might, for exemplary and non-limiting purposes, comprise reading the table values to check for any non-zero numeric values.

If there are no saved assisted guidance regions within table 10, the collar electronics will preferably display or otherwise generate a query at step 750 to determine whether a new assisted guidance zone should be created. This query may, for exemplary purposes only and not solely limiting the invention thereto, be displayed upon the display screen. Next, the collar electronics will monitor any available input channels to determine if there is an electrical input responsive to the query. The response, for exemplary and non-limiting purposes, might comprise the closing or opening of a pushbutton provided on the collar. If there is an electrical input responsive to the query, and the electrical input is indicative of a decision to create a new assisted guidance region, then control will transfer to a separate "create a new region" method at step 752.

If instead there is a response indicative of a decision to not create a new assisted guidance region, or alternatively there is no responsive electrical input at all within a predetermined time period, then the collar electronics will shut off at step 754. This shut off step 754 will permit the collar to be restarted or otherwise initiated to return to collar initiation step 710 if so desired, such as if a user incorrectly responded.

Returning to the check for saved regions at step 720, if the collar electronics determine that there is, in fact, a saved assisted guidance region stored within table 10, then the collar electronics will preferably next check to see if the collar is already located within a saved assisted guidance region at step 721. GPS position determination may for exemplary and non-limiting purposes be used to determine current location, and this data point value retrieved from table 10.

A very beneficial feature of the present invention as illustrated in the preferred embodiment is the fact that this determination can simply be a read of the current position numeric value in table 10, and a check to see if this value is greater than zero. If it is, then the collar will be understood to be within an existing assisted guidance region. The energy and computational power required for such a check is very minimal, while the speed to reach a determination is nearly instantaneous.

So, for exemplary purposes, if at start-up or initiation, the collar electronics detects the location to be position A as illustrated in FIG. 6, then the collar electronics will determine that the collar is within Region 1 at step 721. In such case, the collar electronics will preferably set the current region to the assisted guidance region that the collar is presently within. In other words, at the time of start-up or initiation, if the collar is at point A in FIG. 6, the electronics will progress through steps 720, 721, and 726 without generating an external query.

Noteworthy for the purpose of determining whether the collar is within a particular region is that the "out-of-bounds" zone is ignored. This is because any location not within an assisted guidance region will be identified with a data point associated with the "out-of-bounds" value (zero in the preferred embodiment).

Next, the collar electronics will preferably display or otherwise generate a query at step 730 to determine whether the current assisted guidance region, Region 1 in FIG. 6, should be used. Next, the collar electronics will monitor any available input channels to determine if there is an electrical input responsive to the query. If there is, and the response is indicative of a decision to use the current region, then normal collar operation will begin using the current assisted guidance region, Region 1 of FIG. 6, at step 734.

If instead there is an electrical input indicative of a decision to not use the current region, or alternatively there is no responsive electrical input at all within a predetermined time period, then the collar electronics will preferably display or otherwise generate a query at step 740 to determine whether to update the current assisted guidance region, Region 1. Next, the collar electronics will monitor any available input channels to determine if there is an electrical input responsive to the step 740 query. If there is, and the response is indicative of a decision to update the current region, the collar electronics will exit region lookup method 700 at step 756 and transfer control to a separate "update current region" method. In one embodiment, the "update current region" may be implemented using the "create a new region" method, by simply deleting the current region and then transferring control to the "create a new region" method as at step 752. Alternatively, instructions may be conveyed to indicate when the collar is aligned with an existing assisted guidance region, and to direct any updates.

If instead there is an electrical input indicative of a decision to not update the current assisted guidance region, or alternatively there is no responsive electrical input at all within a predetermined time period, then the collar electronics will once more need to determine whether the collar is inside a region at step 742. This may be reading a saved variable stored in association with step 721, or, as described herein above with respect to step 721, may simply involve the reading of present position and referencing the associated data point in table 10 to determine whether the value of that data point is non-zero. If the collar electronics determine the collar to be inside an assisted guidance region, in the preferred embodiment the collar will preferably shut off at step 746. This is preferred for this case scenario since, in most cases when the collar is already within an assisted guidance region, the user will either want to use the existing region or update it. If the method 700 has progressed to this point, the user most commonly will have incorrectly input information, and will want to more rapidly cycle back to the original choices. Consequently, by shutting off, the user can more quickly return to the two choices, and not have to work through additional queries about other nearby assisted guidance regions prior to being able to use the existing assisted guidance region.

If instead the collar electronics determines that the collar is not inside a region at step 742, then the collar electronics will next search the stored tables for other unqueried regions at step 744. In the illustration of FIG. 6, Region 2 is the next closest assisted guidance region, so the collar electronics may for exemplary purposes set the current region to this closest unqueried region at step 748, and then resume processing back at step 730. Consequently, the collar electronics will preferably step through each available assisted guidance region, querying whether to use the assisted guidance region, or, if not, to update the assisted guidance region. This process will continue until at step 744 the collar electronics determines that there are no more regions to be queried. In this case, the collar electronics will preferably shut off at step 746.

In accord with the preferred embodiment method 700, limits may be set within the collar electronics to determine how far away an assisted guidance region may be to be included in the unqueried regions. In other words, even if there is an assisted guidance region geometry stored in the collar that is located thousands of miles away, there would be no reason to generate a query regarding using that assisted guidance region. Instead, reasonable limits will preferably be established for how far away an assisted guidance region may be to be included in the unqueried region collection.

In an alternative embodiment, rather than shutting off at step 746 when all regions have been queried, the collar electronics may instead reset the regions to unqueried, and resume processing at step 721. In another alternative embodiment, the collar electronics may cycle to step 750 and generate a query to determine whether to create a new region. If so, then processing will continue at step 752, and the collar electronics will follow the normal procedure of tracking the user walking the new assisted guidance region boundary as described herein above and illustrated in the Figures. The option to create a new region may be saved until after all stored assisted guidance regions are exhausted by the user, may be provided as an independent option, or may be presented after each saved assisted guidance region is presented to the user. If there is an electrical input responsive to the query indicative of a decision to create a new region, then the collar will shut off at step 754.

If instead of starting up at position A, the collar is at position B, then at step 721 the collar electronics will determine that the collar is not within a saved region. As understood from above, this may be retrieving a zero value from the current position as represented in table 10. In this case, the collar electronics will try to locate the nearest unqueried region, preferably within a reasonable distance limit, at step 722. If there is such an assisted guidance region, such as Region 2 in FIG. 6, then that assisted guidance zone will be set as the current region at step 725, and processing will continue with step 730. If instead there is not an assisted guidance region within this distance threshold, then processing will preferably continue at step 750 with generation of a query regarding creating a new region.

When the collar is at some distance from any assisted guidance region greater than a threshold at step 720, the threshold which may for exemplary purposes be determined by a designer or by user presets, the collar electronics will determine that a new assisted guidance region is needed, and will then immediately generate a query to determine whether to create a new assisted guidance region at step 750. This is represented in FIG. 6 as position C, which is well outside of both Region 1 and Region 2.

As may be appreciated, this automatic region lookup eliminates the need to remember which name is for what physical boundary location. The collar electronics will immediately identify the nearest assisted guidance region, or instead determine that a new assisted guidance region is needed.

With sufficient electronic storage within the collar unit, and for exemplary purposes only and not solely limiting the present invention, a collar may then be used on a dog at a summer or vacation home, at a winter or primary home in a different location, and at a familiar stopping point between simply by restarting or initiating the collar at each location. The very first time the collar is started at each of these three locations, the collar electronics will convey a query to the user asking if the user wants to will preferably ask the user to walk the region boundary or otherwise define the boundary. However, upon subsequent visits to these locations, the collar electronics will recognize the appropriate region after start-up and position acquisition, both which are completed very shortly after collar start-up.

When desired, a remote control interface or external device may also be provided, but such device is not mandatory. Where such an interface is provided, such as illustrated for exemplary purposes in FIG. 8, assisted guidance regions may also be communicated from an external computing device such as a cellular telephone or various other mobile or fixed computing devices. In such case, the collar unit will preferably be provided with a local wireless interface, though wired connections and any other suitable connections are contemplated herein. The local wireless interface may be of any suitable type, including but not limited to Bluetooth™, cellular, or other type of radio or alternative communications link. Where such an interface is provided, boundaries may also be communicated that are calculated without requiring a person to first walk the perimeter. While not solely limited thereto, this can be particularly helpful at popular places such as at dog parks or other public places that might be frequented by many pet owners. In such case, a map already created for the park may be provided and may, for exemplary purposes, be downloaded from an Internet location through a smart phone, computer or other computing device. The map may be directly forwarded to the collar, or may be edited within the computing device and then forwarded. Additionally, with such an interface a user might draw an assisted guidance region perimeter or even various zones upon an electronically stored map and transmit them to the collar.

In one embodiment, a person may access the collar unit through various channels, including directly through a telephone, such as a "smart phone" containing suitable applications or software commonly referred to as apps. In such case, a Bluetooth™ enabled smart phone may then directly communicate with a Bluetooth™ enabled collar unit. Where suitable GIS or alternative mapping software is provided with the app, or where the smart phone has been used to access the Internet and download the appropriate maps or representations, then the user may directly draw a region, or access the collar unit for existing assisted guidance regions such as Region 1 and Region 2 of FIG. 6. The user may then modify the existing assisted guidance regions, or upload new assisted guidance regions as desired into the collar unit.

Figure 8:
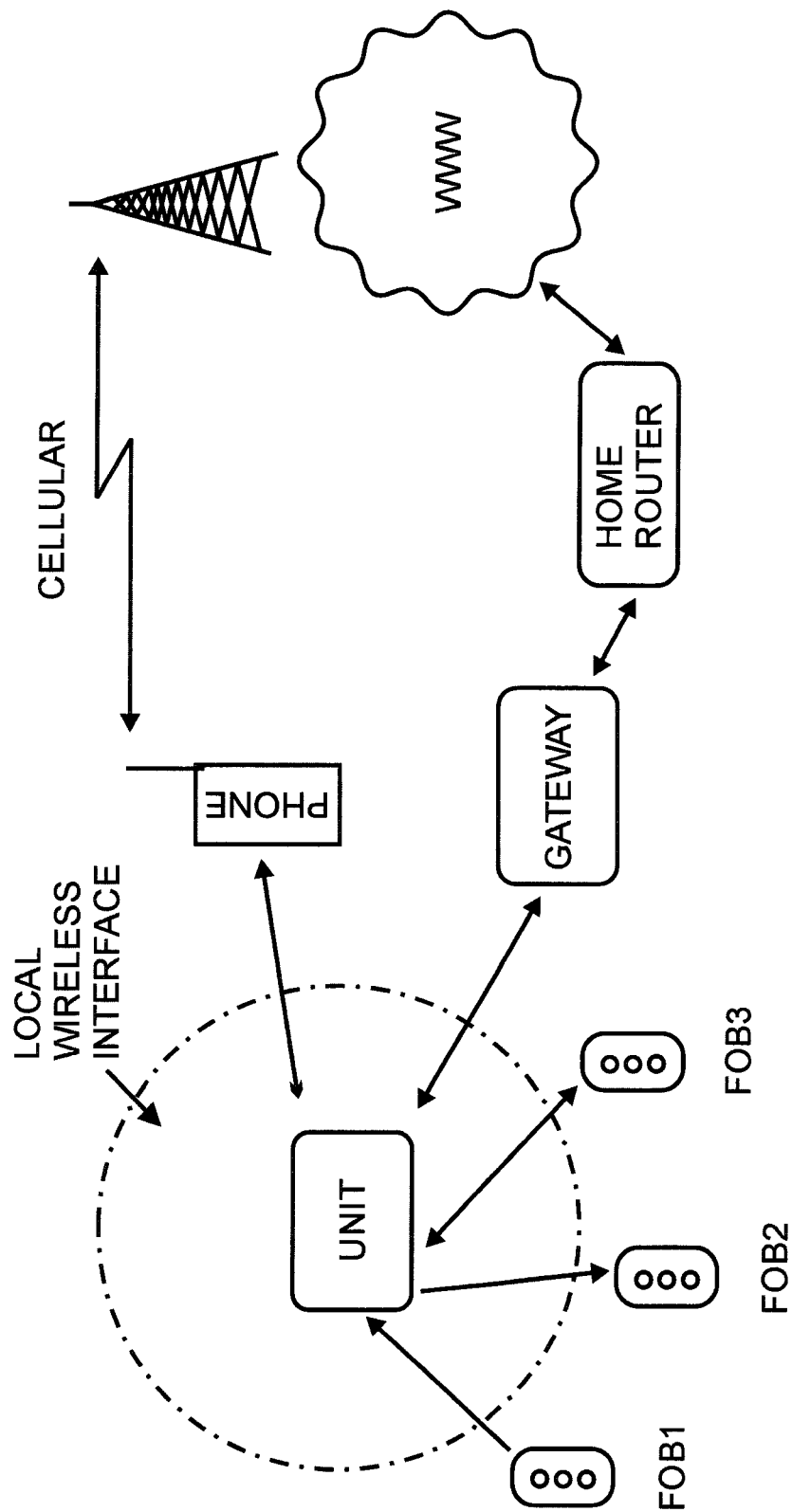
FIG. 8 illustrates preferred and alternative embodiment communications interfaces for facilitating assisted guidance region set up, selection, and editing designed in accord with the teachings of the present invention.

Another access channel illustrated may be provided through a suitable wireless gateway, as illustrated in the preferred embodiment of FIG. 8. The gateway could, for exemplary and non-limiting purposes, include a wireless Local Area Network (LAN); a Wide Area Network (WAN); or even a satellite or other communications link. The gateway may in turn be connected to a home router, or additionally or alternatively directly to the Internet. In either case, a user may then access the collar unit through any suitable computing device, such as a PC, tablet, smart phone, or other device capable of communicating through a LAN, WAN or the Internet. Where communications between the collar unit and other devices is enabled, and particularly where broader access such as through the Internet is enabled, appropriate security and encryption will also preferably be provided to uniquely identify a particular collar unit, and, where desired, to limit access to that collar unit to only those who possess the appropriate encryption or security key.

While not solely limited thereto, this communication between external devices and the collar unit can be particularly helpful as described herein above, when a user is anticipating a visit to popular places such as at dog parks, other parks, or other public places that might be frequented by pet owners. In such instance, these places may already be stored, for exemplary purposes on a web server, and a user would then simply download a pre-drawn assisted guidance zone for the public location. Additionally, with such an interface a user might draw a personal or custom boundary on a map using their personal computing device and transmit the boundary to the collar.

As also illustrated in FIG. 8, the present invention further contemplates that the communications may be unidirectional or bidirectional. The collar unit may be designed to solely receive communications from other devices, such as FOB 1, the gateway, and the phone. In this case, basic operations such as loading a map designed on an external computing devices or changing collar unit settings can be accomplished. If the collar unit is instead designed to solely transmit, and not receive communications, then the collar unit can transmit status, representing the current zone such as the safe zone, first alert zone, second alert zone or outside. In addition, and where desired, the collar unit may then also transmit x/y positions relative to a reference, latitude and longitude locations, or other location information. This information may be particularly desired when the collar unit is outside an assisted guidance region, and the collar unit is herding the animal back into the region. Additionally, this ability to transmit may be used to send messages to a phone or computing device, such as status and other messages, including notifications that the animal has left the region and updates on the progress of herding the animal back into the boundary. As may be appreciated, bidirectional communications offer much flexibility and capability, but this capability must be weighed against system complexity and associated cost, battery drain or life, and other factors that are deemed important at the time of design. Consequently, it will be understood herein that such unidirectional and bidirectional communications represent alternative embodiments that may or may not be implemented, as will be determined at the time of design of a particular system.

While the preferred embodiment table 10 has been described herein above and illustrated in FIGS. 2-4 for the purposes of enablement as cooperative with a self-contained collar apparatus such as that illustrated by Swanson et al in 2007/0204804, it should be apparent that the table 10 incorporating discrete values representative of various zones may be used with other apparatus such as found in many other patents incorporated herein by reference above and other systems, as will be understood and appreciated by those skilled in the art. Furthermore, those skilled in the electronic arts will recognize that the various illustrative logical blocks, modules, circuits, and steps described in connection with the embodiments disclosed herein may be implemented as electronic hardware, software stored in a computer readable medium and executable by a processor, or combinations of both. To clearly illustrate this interchangeability of machine hardware and machine software, various illustrative components, blocks, modules, circuits, and steps are described herein generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

While the foregoing details what are felt to be the preferred and additional alternative embodiments of the invention, no material limitations to the scope of the claimed invention are intended. The variants that would be possible from a reading of the present disclosure are too many in number for individual listings herein, though they are understood to be included in the present invention. For exemplary purposes only, and not solely limiting the invention thereto, the words "dog" and "animal" have been used interchangeably herein above. This is in recognition that the present invention has been designed specifically for use with dogs, but with the understanding that other animals may also be trained using apparatus in accord with the teachings of the present invention. Consequently, the present invention is understood to be applicable to other animals, and the differences that will be required of an alternative embodiment designed for animals other than dogs will be recognized based upon principles that are known in the art of animal training. Further, features and design alternatives that would be obvious to one of ordinary skill in the art are considered to be incorporated herein. The scope of the invention is set forth and particularly described in the claims herein below.

We claim:

1. A method of electronically selecting, with electrical circuitry including at least a processor therein, a wireless location assisted zone guidance system region representation that is electrically stored in electronically accessible memory and that defines an electrical control signal associated with a current geographic location, comprising the steps of:

initiating said electrical circuitry;

electrically locating position fixing signal transmitters;

determining said current geographic location based upon electrical transmissions received from said position fixing signal transmitters;

ascertaining presence of at least one stored assisted guidance region and responsive thereto generating a first ascertain result indicative of no stored assisted guidance regions when no presence is ascertained and generating a second ascertain result indicative of at least one stored assisted guidance region when presence is ascertained;

generating a new region query to create a new assisted guidance region responsive to said first ascertain result;

comparing said current geographic location with a plurality of geographic locations represented by said first one of said at least one stored assisted guidance region responsive to said second ascertain result and responsive thereto generating a first compare result indicative of said current geographic location corresponding to a one of said plurality of geographic locations represented by said first one of said at least one stored assisted guidance region;

setting a current assisted guidance region to said first one of said at least one stored assisted guidance region responsive to said first compare result; and outputting said electrical control signal associated with a said current geographic location to at least one animal stimulation apparatus.

2. The method of electronically selecting a wireless location assisted zone guidance system region representation of claim 1, wherein said comparing step further comprises the steps of:

generating a use region query inquiring whether to use said first one of said at least one stored assisted guidance region;

transmitting said use region query to an electrically powered human interface;

monitoring said electrically powered human interface for a use region electrical signal responsive to said use region query transmission; and performing said setting step responsive to said use region electrical signal response being indicative of a response to use said first one of said at least one stored assistance guidance region.

3. The method of electronically selecting a wireless location assisted zone guidance system region representation of claim 2, further comprising the steps of:

generating an update current region query inquiring whether to update a new assisted guidance region responsive to said use region electrical signal response being indicative of a decision to not use said first one of said at least one stored assistance guidance region;

transmitting said update current region query to said electrically powered human interface;

monitoring said electrically powered human interface for an update current region electrical signal responsive to said update current region query transmission; and updating said current assisted guidance region responsive to an update current region electrical signal being indicative of a response to update said current assisted guidance region prior to said setting step.

4. The method of electronically selecting a wireless location assisted zone guidance system region representation of claim 3, further comprising the steps of:

electrically storing an update current region maximum time period for receiving said update current region electrical signal;

calculating a monitoring time;
finding when said monitoring time exceeds said update current region maximum time period; and
turning off said electrical circuitry responsive to said finding step.

5. The method of electronically selecting a wireless location assisted zone guidance system region representation of claim 3, further comprising the step of:
turning off said electrical circuitry responsive to said update current region electrical signal being indicative of a response to not update said current assisted guidance region and said first compare result being indicative of said current geographic location corresponding to a one of said plurality of geographic locations represented by said first one of said at least one stored assisted guidance region.

6. The method of electronically selecting a wireless location assisted zone guidance system region representation of claim 1, further comprising the steps of:
searching for at least one stored and unqueried adjacent assisted guidance region responsive to said first compare result being indicative of said current location not corresponding to a one of said plurality of locations represented by said first one of said at least one stored assisted guidance region; and
setting said current assisted guidance region to said at least one stored and unqueried adjacent assisted guidance region.

7. The method of electronically selecting a wireless location assisted zone guidance system region representation of claim 1, further comprising the steps of:
storing said wireless location assisted zone guidance system region representation indicia in a table in said electronically accessible memory addressed by a double-indexed array having a pair of indices, comprising the steps of:
electronically associating a first one of said double-indexed array indices to a latitudinal offset from a geographic reference point;
electronically associating a second one of said indices to a longitudinal offset from said geographic reference point; and
storing a guidance zone value at each individual array location representing a single behavioral guidance zone selected from a plurality of distinct behavioral guidance zones;
storing a unique set of behavioral processes associated with each one of said plurality of distinct behavioral guidance zones in said electronically accessible memory;
representing said current geographic location by latitude and longitude points;
electronically determining a latitudinal offset and a longitudinal offset between said current geographic location and said geographic reference point;
electronically retrieving said stored guidance zone value representing said single behavioral guidance zone from an individual array location within said table defined by said latitudinal offset and said longitudinal offset; and
electronically retrieving said unique set of behavioral processes associated with said stored guidance zone value.

8. The method of electronically selecting a wireless location assisted zone guidance system region representation of claim 7, wherein said wireless location assisted zone guidance system region representation that is electrically stored in electronically accessible memory comprises at least a safe value and a warning value, with each current geographic location having a one of said at least a safe and a warning value, and wherein said step of ascertaining presence of at least one stored assisted guidance region comprises the step of discerning whether said stored guidance zone value representing said single behavioral guidance zone comprises an out-of-bounds value.

9. The method of electronically selecting a wireless location assisted zone guidance system region representation of claim 8, wherein said step of ascertaining presence of at least one stored assisted guidance region further comprises the step of electronically resolving whether all said stored guidance zone values represent an out-of-bounds value, responsive to a discerning in said discerning step that said stored guidance zone value representing said single behavioral guidance zone comprises an out-of-bounds value.

10. The method of electronically selecting a wireless location assisted zone guidance system region representation of claim 1, further comprising the steps of:
resolving a second current geographic location at a time subsequent to said determining step based upon electrical transmissions received from said position fixing signal transmitters; and
varying said electrical control signal that is output to said at least one animal stimulation apparatus responsive to said second current geographic location relative to said first one of said at least two assisted guidance regions when said current geographic location is within said first one of said at least two assisted guidance regions.

11. The method of electronically selecting a wireless location assisted zone guidance system region representation of claim 1, wherein said wireless location assisted zone guidance system region representation that is electrically stored in electronically accessible memory comprises at least a safe value and a warning value, with each current geographic location having a one of said at least a safe and a warning value.

12. The method of electronically selecting a wireless location assisted zone guidance system region representation of claim 1, wherein said electrical circuitry further comprises a human interface adapted to operatively enable selective control over said processor, and further comprising the step of conveying said new region query to said human interface when said comparing step generates a second compare result indicative of said current geographic location corresponding to an out-of-bounds value.

* * * * *